US012659106B2

(12) United States Patent
Wittberg et al.

(10) Patent No.: US 12,659,106 B2
(45) Date of Patent: Jun. 16, 2026

(54) NETWORK NODE AND METHOD IN A RADIO NETWORK

(71) Applicant: Telefonaktiebolaget LM Ericsson (publ), Stockholm (SE)

(72) Inventors: Mikael Wittberg, Uppsala (SE); Ying Sun, Täby (SE); Yufeng Zhao, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 406 days.

(21) Appl. No.: 18/267,593

(22) PCT Filed: Dec. 22, 2020

(86) PCT No.: PCT/SE2020/051253
§ 371 (c)(1),
(2) Date: Jun. 15, 2023

(87) PCT Pub. No.: WO2022/139638
PCT Pub. Date: Jun. 30, 2022

(65) Prior Publication Data
US 2024/0056251 A1 Feb. 15, 2024

(51) Int. Cl.
*H04L 5/00* (2006.01)
*H04W 36/00* (2009.01)

(52) U.S. Cl.
CPC ............ *H04L 5/005* (2013.01); *H04L 5/0035* (2013.01); *H04W 36/00835* (2018.08)

(58) Field of Classification Search
CPC ............ H04L 5/00; H04L 5/14; H04W 36/00; H04W 36/06; H04W 36/30; H04W 28/24;
(Continued)

(56) References Cited

U.S. PATENT DOCUMENTS

| | | | |
|---|---|---|---|
| 7,945,268 B2 * | 5/2011 | Sung ..................... | H04W 16/12 455/449 |
| 8,515,440 B2 * | 8/2013 | Damnjanovic ....... | H04L 1/0026 455/450 |

(Continued)

FOREIGN PATENT DOCUMENTS

EP 1912456 A2 4/2008

OTHER PUBLICATIONS

Ericsson, "R1-1902528: Lower-layer mobility enhancements," 3GPP TSG-RAN WG1 Meeting #96, Feb. 25-Mar. 1, 2019, Athens, Greece, 8 pages.
(Continued)

*Primary Examiner* — Man U Phan
(74) *Attorney, Agent, or Firm* — Withrow & Terranova, PLLC

(57) ABSTRACT

A method performed by a network node for allocating reference signals to a set of sector carriers provided by the network node for a communication with a UE in a radio network is provided. The network node allocates reference signals to each respective sector carrier, by for each respective sector carrier, allocating a reference signal to the sector carrier, and a parameter representing the sector carrier. The network node transmits the reference signal in each respective sector carrier and evaluates a neighboring relationship between the sector carriers, to identify if two neighboring sector carriers within the one or more cells are allocated the same reference signal. When identified that two neighboring sector carriers are allocated the same reference signal within one or more cells comprising the sector carriers, the network node re-allocates at least one of the two neighboring sector carriers with another available reference signal.

11 Claims, 20 Drawing Sheets

301. Allocate reference signals to each respective sector carrier out of a set of sector carriers in a cell, by for each respective sector carrier out of the set of sector carriers, allocating a reference signal to the sector carrier, and a parameter representing the sector carrier. The number of available different reference signals to be allocated are less than the number of sector carriers within the cell.

302. Transmit the reference signal as allocated, in each respective sector carrier within the cell.

303. Evaluate a neighboring relationship between the sector carriers in the set of sector carriers, to identify if two neighboring sector carriers within the cell are allocated the same reference signal, which evaluating is based on the respective reference signals as allocated, and one or more uplink signals received as a response to at least one respective transmitted reference signal.

304. Re-allocate at least one of the two neighboring sector carriers with another available reference signal when identified that two neighboring sector carriers are allocated the same reference signal within the cell such that the two neighboring sector carriers are allocated different reference signals within the cell.

305. Arrange neighbor sector carriers into a group of sector carriers, when the threshold value is exceeded and the neighboring sector carriers in the set of sector carriers are still allocated the same reference signal within the cell.

306. Allocate one reference signal to the group of sector carriers

(58) Field of Classification Search
CPC ..... H04W 72/04; H04W 72/10; H04W 24/02;
H04W 24/06; H04W 24/08; H04W 56/00;
H04W 52/14
USPC ......................................................... 370/331
See application file for complete search history.

(56) References Cited

U.S. PATENT DOCUMENTS

| | | | | |
|---|---|---|---|---|
| 8,644,865 B2 * | 2/2014 | Chung | ................. | H04L 5/0048 |
| | | | | 386/296 |
| 9,699,046 B2 * | 7/2017 | Chung | ................. | H04L 5/0048 |
| 10,178,571 B2 * | 1/2019 | Park | ...................... | G01S 5/0236 |
| 10,231,165 B2 * | 3/2019 | Vajapeyam | ......... | H04W 40/244 |
| 10,455,370 B2 * | 10/2019 | Park | ...................... | H04L 5/0048 |
| 10,750,466 B2 * | 8/2020 | Nagaraja | ............. | H04W 56/005 |
| 11,088,729 B2 * | 8/2021 | John Wilson | ........... | H04L 5/001 |
| 11,528,675 B2 * | 12/2022 | Nagaraja | ............. | H04W 56/005 |
| 2020/0007194 A1 | 1/2020 | John Wilson et al. | | |
| 2023/0269638 A1 * | 8/2023 | Raghavan | ............. | H04W 24/10 |
| | | | | 370/252 |
| 2023/0276282 A1 * | 8/2023 | Li | ........................ | H04L 5/0053 |
| | | | | 370/329 |

OTHER PUBLICATIONS

International Search Report and Written Opinion for International
Patent Application No. PCT/SE2020/051253, mailed Jul. 14, 2021,
9 pages.

* cited by examiner

12

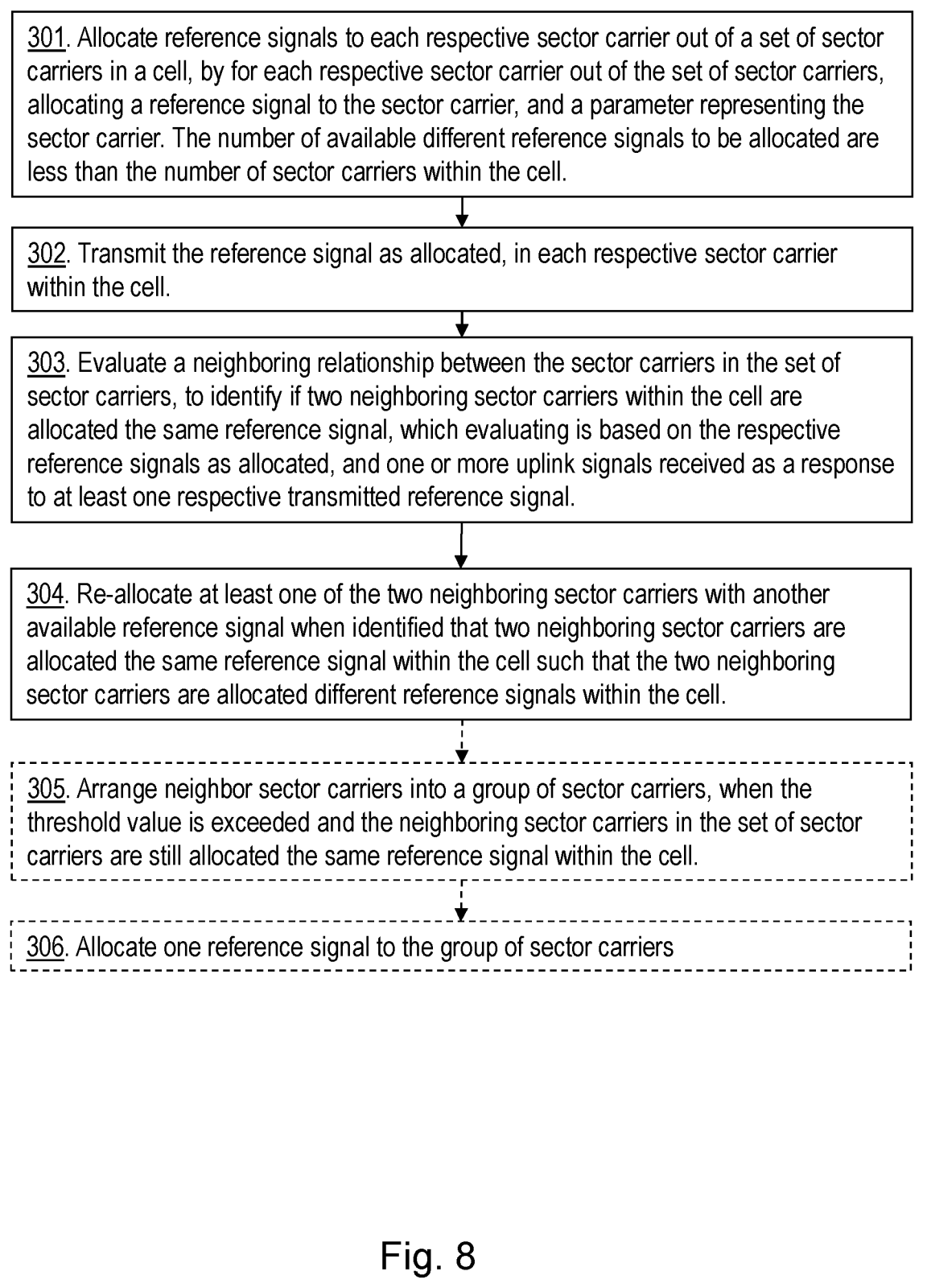

301. Allocate reference signals to each respective sector carrier out of a set of sector carriers in a cell, by for each respective sector carrier out of the set of sector carriers, allocating a reference signal to the sector carrier, and a parameter representing the sector carrier. The number of available different reference signals to be allocated are less than the number of sector carriers within the cell.

302. Transmit the reference signal as allocated, in each respective sector carrier within the cell.

303. Evaluate a neighboring relationship between the sector carriers in the set of sector carriers, to identify if two neighboring sector carriers within the cell are allocated the same reference signal, which evaluating is based on the respective reference signals as allocated, and one or more uplink signals received as a response to at least one respective transmitted reference signal.

304. Re-allocate at least one of the two neighboring sector carriers with another available reference signal when identified that two neighboring sector carriers are allocated the same reference signal within the cell such that the two neighboring sector carriers are allocated different reference signals within the cell.

305. Arrange neighbor sector carriers into a group of sector carriers, when the threshold value is exceeded and the neighboring sector carriers in the set of sector carriers are still allocated the same reference signal within the cell.

306. Allocate one reference signal to the group of sector carriers

Fig. 8

Computer program 1780

Carrier 1790

Memory 1770

Processor 1760

Input/Output Interface 1700

Network node 110

Transmitting Unit 1720

Allocating Unit 1710

Re-allocating Unit 1740

Evaluating Unit 1730

Network node 110

NETWORK NODE AND METHOD IN A RADIO NETWORK

This application is a 35 U.S.C. § 371 national phase filing of International Application No. PCT/SE2020/051253, filed Dec. 22, 2020, the disclosure of which is incorporated herein by reference in its entirety.

TECHNICAL FIELD

Embodiments herein relate to a network node and a method therein. In some aspects, they relate to allocating reference signals to a set of sector carriers provided by the network node for a communication with a User Equipment (UE) in a radio network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more Core Network (CN)s. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO. NR, Sector Carriers, Cells, SSB, CSI-RS An NR Cell is defined by a Physical Cell Identity (PCI) transmitted in a Synchronization Signaling Block (SSB) and a Global Cell ID in System Information Block (SIB) #1 (SIB-1).

As the NR Cell is defined by the PCI the NR Cell may comprise multiple Transmission Points (TRPs), also referred to as network nodes herein, that build up the same cell.

A sector carrier such as an NR Sector Carrier (SectorCarrier) represents resources provided by one of the TRPs comprised in the NR cell.

SSBs and Channel-State Information (CSI)—Reference Signals (RS) are radio resources of the NR cell.

In a typical radio network, an operator needs to configure cells that covers certain geographical areas, which involves providing a lot of detailed information to a network node providing sector carries in a cell in the radio network. To simplify radio network deployment and to avoid impacting upper layers as much as possible, there is a possibility to combine multiple TRPs such as network nodes into one cell and simplify the configuration and deployment of cells in a radio network. Upper layer when used herein means any layers used for configuration of a UE, such as the Radio Resource Control (RRC) protocol, configuration of cell related parameters, and deployment related settings, such as the configuration of neighbouring relations with other cells.

Furthermore, it is possible to reduce the upper layer signaling to keep track of a UE while the UE is moving between the TRPs, because the mobility performed between the TRPs may be handled internally by lower layers without the need to communicate with upper layers. Lower layer when used herein means the Media Access Layer (MAC) or lower.

This is illustrated in FIG. 1, showing a set of geographical areas 10 forming a radio network 12. The set of geographical areas, also referred to as set of sector carriers, are shown as hexagons in FIG. 1. One view of this radio network 10 is to consider these areas as cells, and for each of these cells, the operator typically needs to provide a lot of information to the TRPs to configure cells that covers the respective geographical areas. Also, whenever a UE moves between these cells, there is an overhead with mobility due to the need to perform upper layer signaling. Overhead with mobility means that there will be a certain interrupt in the UE data communication during the time the upper layer performs the signalling and it means that processing resources are needed in upper layer nodes whenever the UE needs to perform mobility.

Another view of this radio network 10 is to consider the set of areas as sector carriers instead of cells. Using this latter consideration results in a simplified network configuration and allows a more seamless mobility between the sector carriers because there is less need to communicate with upper layers while the UE is moving within this area.

Each cell is normally identified in some way, and in NR, a SSB reference signal that is sent for each cell encodes a PCI which is used by the UE to identify each cell.

Different SSB with the same PCI may have a different beam index and then represent different beams of the same cell, as illustrated in FIG. 2a and FIG. 2b. A beam index, also referred to as an SSB index, when used herein means an index that is associated with or corresponds to a beam such that the beam can be identified by the UE. The beam indexes are transmitted in a Master Information Block (MIB). FIG. 2a depicts a cell with a single SSB1. FIG. 2b depicts a cell with multiple beams with same PCI (PSS/SSS) and different SSB index per beam, SSB1.1, SSB1.2, SSB1.3, and SSB1.4, wherein the beam index for the first beam SSB1, is 1 and is referred to as SSB1.1 in FIG. 2*b*, and the beam index for the second beam SSB1, is 2, and is referred to as SSB1.2 in FIG. 2*b*.

A beam index, also referred to as an SSB index, may also be used to identify TRPs such as network nodes, and/or sector carriers in a cell.

FIG. 3*a* illustrates an NR cell with multiple-TRPs sharing the same SSB. FIG. 3*b* illustrates an NR cell with multiple-TRPs with different SSBs i.e. with different beam index, wherein the different SSBs are associated with the same PCI.

There is however a limitation on the number of SSB index available.

Number of SSBs that can share the same PCI is limited by 3GPP according to Table 1 below. Table 1 depicts maximum number of SSB index per PCI possible.

TABLE 1

| Carrier Frequency | <3 GHz | [3, 6] GHz | [6, 52, 6] GHz |
|---|---|---|---|
| # SSB | 4 | 8 | 64 |

Other reference signals are also normally needed to be sent by the network and used by the UE for different purposes. One such example is the CSI-RS reference symbol that normally is sent by the network node to allow the UE to estimate the radio condition in DL, and the UE can then send a CSI-RS report to the network indicating different radio related information such as a Channel Quality Information (CQI) value, which indicates to the network node which channel encoding to use for DL transmissions. There is however a limitation in 3GPP on how many of these CSI-RS resources the UE can be configured with at any given time. For instance, in the case of a-periodic CSI-RS reporting, the UE is limited to a maximum of four CSI-ReportConfig information elements, specified in 3GPP 38.331 RRC specification, per bandwidth part in a cell. Currently many UEs only support up to two resources due to capability limitations. CSI-ReportConfig means the RRC information element that is used for the configuration of CSI-RS resources. This means that the UE may be configured with at most four CSI-RS resource sets at any given time in a cell.

This means that the number of SSB index available is limited to four, eight, or 64 depending on the bandwidth, and that the number of CSI-RS resource sets that the UE can be configured with at any given time in a cell is limited to at most four. The SSB index is normally used for detection of beams and/or sector carriers. The CSI-RS resources are used for link adaptation.

For CSI-RS the limitation causes problems with radio interference between neighbouring sector carriers if they are using the same CSI-RS resource, and for SSB index it makes it harder to identify unique beams of sector carriers if these indexes are limited.

In a-periodic CSI-RS reporting the network has requested reports at any time using a Physical Downlink Control Channel (PDCCH) signal.

As an additional limitation, many UEs cannot even handle four CSI-ReportConfig because of internal limitations and may for instance signal in their capabilities that they can only support two of these resources.

SUMMARY

As a part of developing embodiments herein a problem was identified by the inventors and will first be discussed.

In a multi-TRP cell, it is required that an CSI-RS resource on a TRP shall not interfere with the neighbour TRPs. However, to assign unique CSI-RS resource per TRP costs much spectrum resources and UE capability normally is limited to two to eight CSI-RS resources. Similar problem also applies to SSB indexes. There are limited number of SSB indexes, so it is not possible to have unique SSB index per TRP.

CSI-RS and SSB index are also used for beams.

To handle fewer number of unique resources than it is needed, it is required to re-use and map a resource to a TRP or a beam. To manually configure the mapping between a TRP or beam and an CSI-RS resource or SSB resource will increase complexity for deployment and results in a non-optimal resource usage.

Due to the need to simplify the configuration of any radio resources sent by sector carriers, it is important to not request the operator to provide any information that is not strictly required. Information that may be difficult to provide by an operator includes specifying which sector carriers that are neighbours, and this in particular difficult in radio networks that are setup indoors or in other difficult radio environments where it is not obvious which sector carriers that are neighbours.

FIG. 4 shows an example of a cell with 12 sector carriers numbered from 1 to 12, and where a resource identity 0, 1 2 or 3 has been randomly assigned to the sector carriers 1-12. Thus, the identities available are referred to as 0, 1, 2 and 3 in the central part of each hexagon in FIG. 4. The sector carriers are referred to as hexagons in FIG. 4 and are numbered from 1 to 12 in the upper left side of each hexagon.

FIG. 4 shows an example of a set of sector carriers which requires a resource or identity X, but there are only 4 different types of X resources or identities available. If the resources or identities are assigned randomly this may result in many cases where two neighbouring sector carriers have the same resource or identity, as shown in the picture. If two sector carriers that are neighbours have the same CSI-RS resource this may lead to non-optimal downlink performance. This is because the CSI-RS resource will be received by a UE from two different sector carriers, even though the UE is currently associated with only one of these sector carriers, which is the sector carrier used for DL traffic. Hence, the reception of the CSI-RS reference signal from the sector carrier not used for DL traffic will cause the UE to estimate an incorrect radio condition and in addition the two CSI-RS signals may cause interference of each other due to different timing. For SSB index, it would be possible to use the SSB index as identification of a sector carrier provided that there are no sector carriers that are neighbours which have the same SSB index. The problem is however that the operator of the radio network may not have any knowledge of the neighbouring relationships between the sector carriers. The assignment in FIG. 4 for example cannot distinguish sector carrier 1 and 2 and 3, all three being assigned resource or identity 0.

FIG. 5 shows an example wherein a UE served by a sector carrier SSB INDEX 1 with neighbour sector carriers assigned same SSB index, SSB INDEX 0. The UE in SSB INDEX 1 will measure the joint power from both neighbours of SSB INDEX 0, and a problem is that the TRP serving the UE does not know which sector carrier the UE is close to.

An object of embodiments herein is to improve the performance of a radio network using sector carriers.

To get more optimal radio performance compared to the example depicted in FIG. 4, embodiments herein avoid to have two sector carriers using the same resource or identity. FIG. 6 shows an example of a cell with 12 sector carriers numbered from 1 to 12. FIG. 5 shows the same case as above but where a resource or identity 0, 1 2 or 3 has been allocated in such a way that neighbouring sector carriers do not have the same resource or identity. This should normally lead to more optimal radio performance. The identities available are referred to as 0, 1, 2 and 3 in the central part of each hexagon in FIG. 5. The sector carriers are referred to as hexagons also in FIG. 5 and are numbered from 1 to 12 in the upper left side of each hexagon. Embodiments herein provides a method for achieving the more optimal configuration as illustrated in FIG. 5.

According to an aspect of embodiments herein, the object is achieved by a method performed by a network node for allocating reference signals to a set of sector carriers provided by the network node for a communication with a UE in a radio network. The network node allocates reference signals to each respective sector carrier out of a set of sector carriers. This is performed by for each respective sector carrier out of the set of sector carriers, the network node allocates a reference signal to the sector carrier, and a parameter representing the sector carrier. The number of available different reference signals to be allocated are less than the number of sector carriers within the set of sector carriers. The network node transmits the reference signal as allocated, in each respective sector carrier. The network node evaluates a neighbouring relationship between the sector carriers in the set of sector carriers, to identify if two neighbouring sector carriers within one or more cells are allocated the same reference signal, which cell comprises the set of sector carriers. The evaluating is based on the respective reference signals as allocated, and one or more Uplink (UL) signals received as a response to at least one respective transmitted reference signal. When identified that two neighbouring sector carriers are allocated the same reference signal within the one or more cells, the network node re-allocates at least one of the two neighbouring sector carriers with another available reference signal such that the two neighbouring sector carriers are allocated different reference signals within the one or more cells.

According to another aspect of embodiments herein, the object is achieved by a network node configured to allocate reference signals to a set of sector carriers provided by the network node for a communication with a UE in a radio network, wherein the network node is further configured to:

Allocate reference signals to each respective sector carrier out of a set of sector carriers, by for each respective sector carrier out of the set of sector carriers, allocating a reference signal to the sector carrier, and a parameter representing the sector carrier, wherein the number of available different reference signals to be allocated are adapted to be less than the number of sector carriers within the set of sector carriers, transmit the reference signal as allocated, in each respective sector, evaluate a neighbouring relationship between the sector carriers in the set of sector carriers, to identify if two neighbouring sector carriers within a cell comprising the set of sector carriers, are allocated the same reference signal, which evaluating is adapted to be based on: the respective reference signals as allocated, and one or more UL signals received as a response to at least one respective transmitted reference signal, and when identified that two neighbouring sector carriers are allocated the same reference signal within the one or more cells, re-allocate at least one of the two neighbouring sector carriers with another available reference signal such that the two neighbouring sector carriers are allocated different reference signals within the one or more cells.

Since the network node allocates reference signals to each respective sector carrier out of a set of sector carriers wherein the number of available different reference signals to be allocated are less than the number of sector carriers within the set of sector carriers, transmits the reference signal as allocated, the network node evaluates a neighbouring relationship between the sector carriers in the set of sector carriers. This makes it possible for the network node to identify if any two neighbouring sector carriers within a cell are allocated the same reference signal, which may cause interreference in the cell. Then, when the network node has identified that two neighbouring sector carriers that are allocated the same reference signal within the cell, the network node re-allocates at least one of the two neighbouring sector carriers with another available reference signal such that the two neighbouring sector carriers are allocated different reference signals within the cell. This results in less interference in a cell and in turn, an improved performance of the radio network using sector carriers.

BRIEF DESCRIPTION OF THE DRAWINGS

Examples of embodiments herein are described in more detail with reference to attached drawings in which:

FIG. 8 is a flowchart depicting embodiments of a method in a network node.

DETAILED DESCRIPTION

Figure 1:
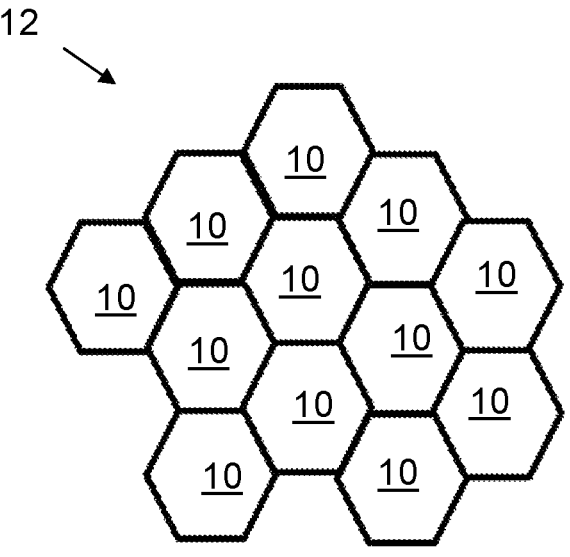
FIG. 1 is a schematic block diagram illustrating prior art.
Figure 2A:
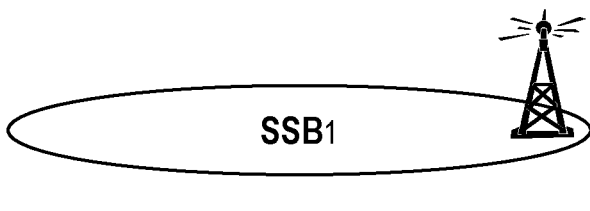
FIG. 2 is a schematic block diagram illustrating prior art.
Figure 2B:
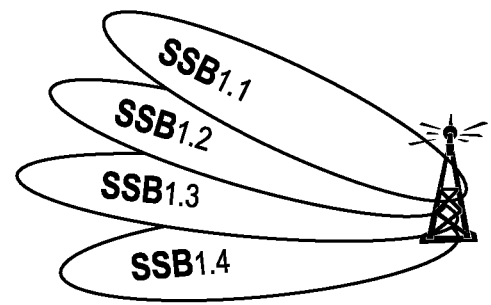
Figure 3A:
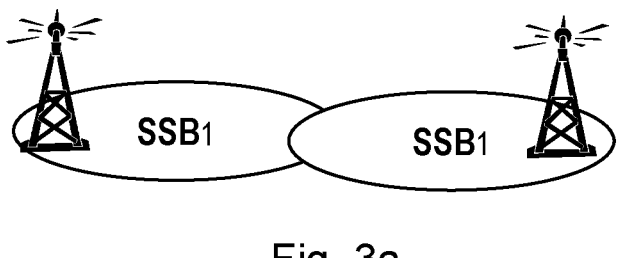
FIG. 3 is a schematic block diagram illustrating prior art.
Figure 3B:
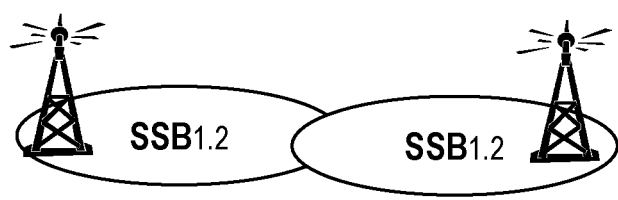
Figures 4, 6:
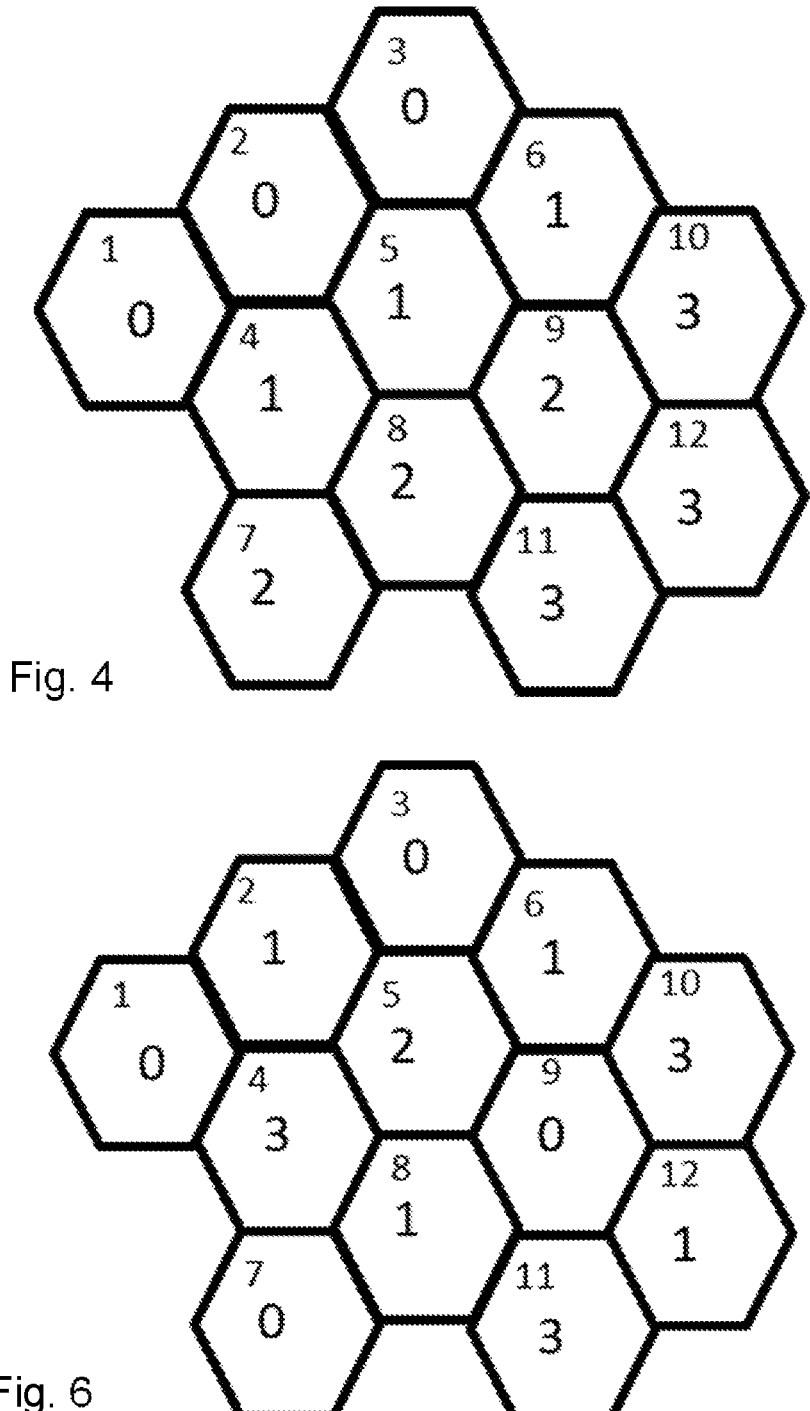
FIG. 4 is a schematic block diagram illustrating prior art.
FIG. 6 is a schematic block diagram illustrating embodiments herein.
Figure 5:
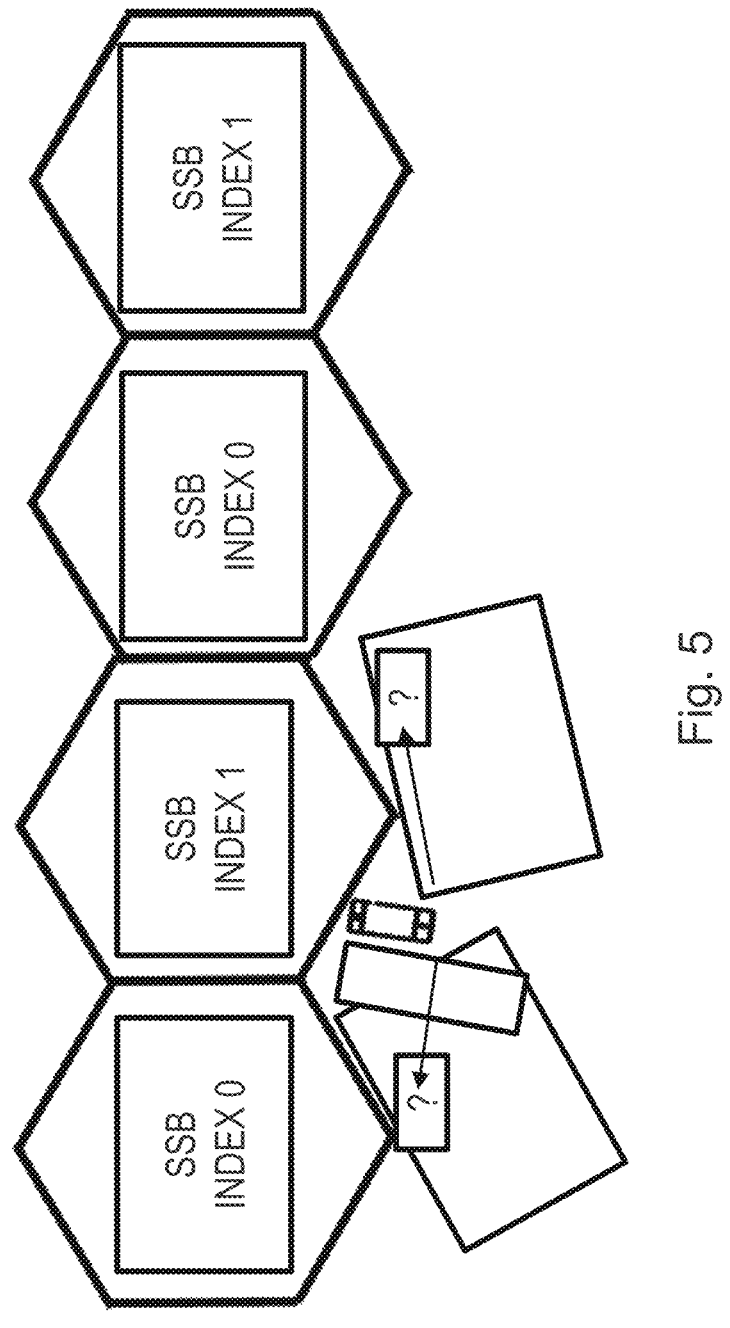
FIG. 5 is a schematic block diagram illustrating prior art.

Embodiments herein provide a method performed by a network node to allocating reference signals to a set of sector carriers provided by the network node for a communication with a UE in a radio network.

In some examples, the method according to embodiments herein may be seen to have a two-step approach. This can be seen from the following example embodiment.

At initial cell setup in a first step, the network node allocates, also referred to as assigns, SSB indexes or other relevant reference signals according to global beamforming directions, also referred to as sector carrier direction. A global beamforming direction, and a sector carrier direction are e.g. defined as an angle to east, if the beam is formed, i.e. directed, towards east. Independent which sector carriers the transmission belongs to, as long as the transmission beam direction is the same, the same SSB index is allocated.

In a second step, the network node evaluates the neighbouring relationships between the sector carriers and re-allocates the resources or identities of the sector carriers in such a way that using the same resource or identity between neighbouring sector carriers is avoided.

Whenever a sector carrier selection is performed for a UE and hence switches from one serving sector carrier to another, the network node knows that there is a neighbouring relationship between these two sector carriers, because otherwise the UE would not have done this selection. The network node may e.g. keep a table of all known neighbouring relationships for which it will learn during the time a cell is active for traffic.

In addition to building this neighbouring table, the network node may also re-allocate one or more resource identities to the sector carriers in such a way that having two neighbouring sector carriers with the same resource identity is avoided.

The network node may use an algorithm to obtain the neighbour sector carriers relation within a cell such as a multi-network node cell, also referred to as a multi-TRP cell, and e.g. allocate reference signals such as e.g. an SSB index and/or an CSI-RS resource set to the SC accordingly.

The embodiments provided herein e.g. have the following advantages:

In an example scenario wherein the number of reference signals that can be used by the UE is less than the number of sector carriers in the network, and when the interference caused by neighbouring sector carriers having the same reference signal will lead to reduced throughput for the UE, embodiments herein provide improved performance because the risk of having two neighbouring sector carriers using the same reference signals will be minimized.

In some embodiments herein, the network node will automatically learn, i.e. deduce, the neighbouring relationships between the sector carriers within a cell of a radio network. This makes it possible for the network node to reassign the reference signals used by the sector carriers in order to avoid having two neighbouring sector carriers using the same reference signal.

Figure 7:
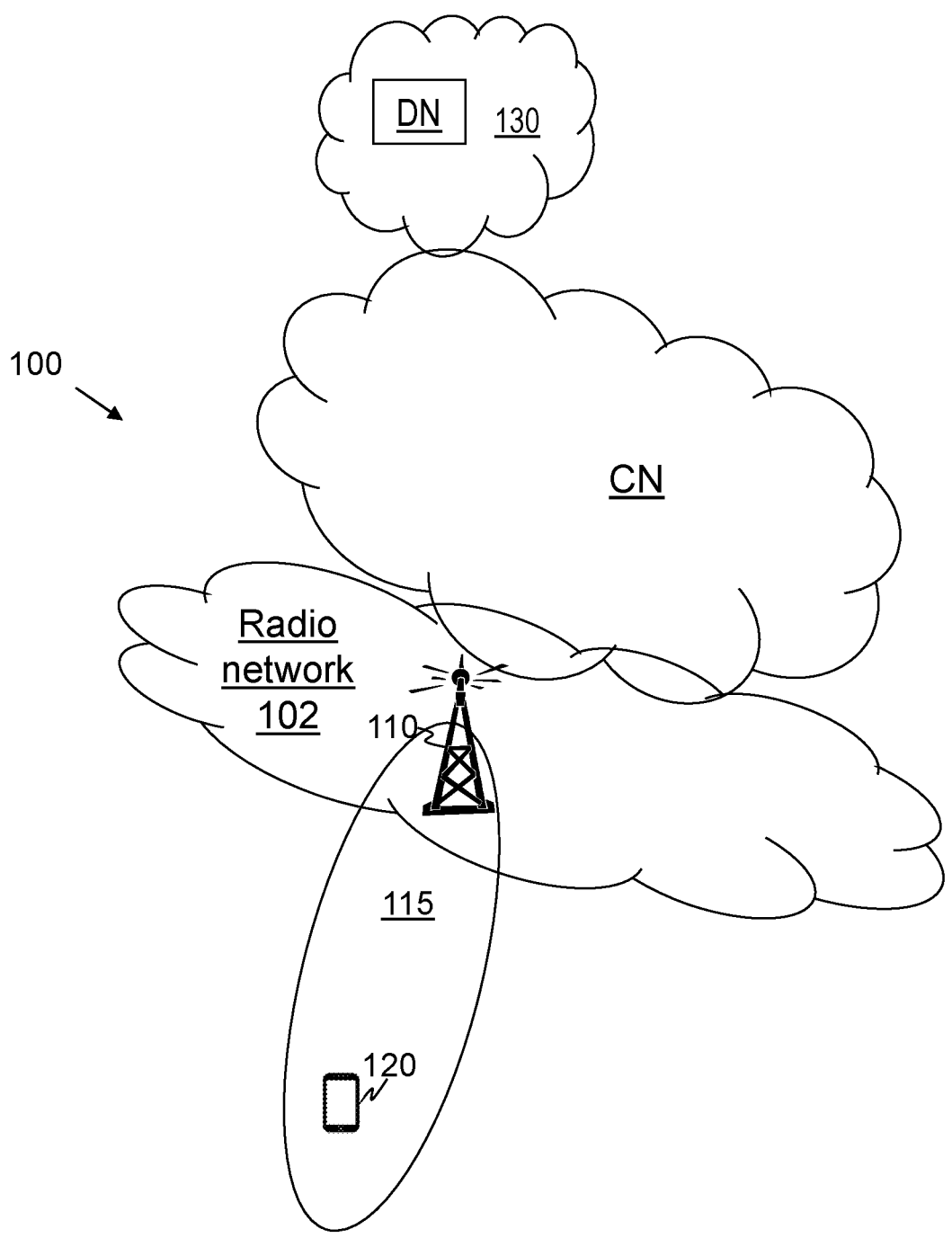
FIG. 7 is a schematic block diagram illustrating embodiments of a wireless communications network.

FIG. 7 is a schematic overview depicting a wireless communications network 100 wherein embodiments herein may be implemented. The wireless communications network 100 comprises one or more radio networks s such as a radio network 102, and one or more CNs. The wireless communications network 100, the radio network 102 and CN may use a number of different technologies, such as Wi-Fi, Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such as e.g. a network node 110. The network node 110 provide radio coverage in a number of cells which may also be referred to as a beam or a beam group of beams, such as a cell 115 provided by the network node 110.

The network node 110, may be any of a radio network node, NG-RAN node, a transmission and reception point e.g. a base station, a TRP, a radio access network node, a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a UE such as UE 120, within a service area served by the network node 110, depending e.g. on the first radio access technology and terminology used. The network node 110 may be referred to as a serving radio network node and communicates with the UE 120 with Downlink (DL) transmissions to the UE 120 and Uplink (UL) transmissions from the UE 120.

In particular embodiments of the disclosure, the base station 110 may comprise a plurality of separate units over which the functionality of the base station 110 is distributed. The base station 110 may thus be a distributed (e.g. modular) base station such as, for example, an Open Radio Access Network (O-RAN) node.

In these embodiments, the base station 110 may comprise a radio equipment controller (e.g. a baseband processing unit) and one or more remote radio equipment nodes (e.g. radio frequency transceivers). The radio equipment nodes are not co-located with the radio equipment controller and, in particular, the radio equipment nodes may be positioned at a significant distance from the radio equipment controller such that the radio equipment controller can centrally serve a large number of remote radio equipment nodes.

The radio equipment controller may be directly or indirectly connected to the remote radio equipment nodes. The radio equipment nodes may be connected to the radio equipment controller via one or more fibre links (e.g. lossless fibre links). The interface between the units in a distributed base station be defined by the Common Public Radio Interface (CPRI), which standardizes the protocol interface between a radio equipment controller and radio equipment nodes in wireless distributed base stations to enable interoperability of equipment from different vendors. In order to reduce the number of connections (e.g. fibre links) needed, the radio equipment nodes may be connected to a common CPRI concentrator, for example.

Thus, in embodiments in which the base station 110 comprises a distributed base station, the processing circuitry and the computer-readable medium may be comprised in, for example, a radio equipment controller which is configured to control one or more radio equipment nodes forming part of the base station 110. Thus, the methods described herein may be performed by a radio equipment controller in the base station 110. Alternatively, the processing circuitry and the computer-readable medium may be comprised in one of the radio equipment nodes (e.g. at a transceiver).

One or more UEs operate in the radio network 102, such as e.g. the UE 120. The UE 120 may also referred to as a device, an IoT device, a mobile station, a non-access point (non-AP) STA, a STA, a user equipment and/or a wireless terminals, communicate via one or more Access Networks (AN), e.g. RAN, to one or more CNs. It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell. The UE 120 is in some example scenarios served by the network ode 110 in the cell 115.

Methods herein may be performed by the network node 110. As an alternative, a Distributed Node (DN) and functionality, e.g. comprised in a cloud 130 as shown in FIG. 7, may be used for performing or partly performing the methods herein.

The above described problem is addressed in a number of embodiments, some of which may be seen as alternatives, while some may be used in combination.

Embodiments of a method will first be described in a more general way together with FIG. 8. Embodiments of the method will then be exemplified and described more in detail later on in the document.

FIG. 8 shows example embodiments of a method performed by the network node 110 for allocating reference signals to a set of sector carriers provided by the network node 110 for a communication with the UE 120 in the radio network 102.

Reference signals when used herein may comprise any one or more out of: synchronisation signals such as SSB resources, CSI-RS resources, and CSI-IM resource.

The sector carrier represents a resource provided by the network node 110 in the one or more cells 115. A sector carrier when used herein may also be referred to as a beam.

The set of sector carriers provided by the network node 110 will be a cell or a part of a cell together with a set of sector carriers provided by another one or more network node in a multi TRP scenario.

A beam when used herein e.g. means a radio signal sent in a specific direction.

Beamforming when used herein e.g. means to enable communication with a UE using beams that are directed towards the UE. A radio node, such as the network node 110, is normally able to transmit beams in different directions, and each such beam may also be considered to be a sector carrier. Other neighbouring radio nodes may also transmit beams, and a set of beams from a set of radio nodes may constitute the set of all sector carriers that are configured within a specific cell.

The method comprises the following actions, which actions may be taken in any suitable order. Optional actions are referred to as dashed boxes in FIG. 8.

Action 301

The network node 110 allocates reference signals to each respective sector carrier out of a set of sector carriers. In some embodiments the set of sector carriers are e.g. comprised in one or more cells 115. This allocation of reference signals to respective sector carriers will be used as a basis for to later on be able to evaluate a neighbouring relationship between the sector carriers, to identify if any two neighbouring sector carriers within the one or more cells 115 are allocated the same reference signal.

Neighbouring sector carriers when used herein, means sector carriers that are providing radio coverage next to each other.

The allocation of the reference signals is performed by, for each respective sector carrier out of the set of sector carriers, allocating a reference signal to the sector carrier, and a parameter representing the sector carrier. The number of available different reference signals to be allocated are less than the number of sector carriers in the set of sector carriers.

The parameter representing the sector carrier, may comprise any one or more out of:
(i) a direction of the sector carrier,
(ii) an index of the sector carrier, such as e.g. SSB indexes, CSI-RS indexes
(iii) a random parameter,
(iv) a time resource of the sector carrier, and
(v) a frequency resource of the sector carrier.
This will be described more in detail below.

Action 302

The network node 110 transmits the reference signal as allocated, in each respective sector carrier, e.g. in the one or more cells 115. This may mean that the network node 110 transmits each reference signal in its respective allocated sector carrier, together with the corresponding parameter representing the sector carrier.

The UE 120 then transmits one or more UL signals to the network node 110, as a response to at least one respective transmitted reference signal.

Action 303

The network node 110 knows how the respective reference signals are allocated to each respective sector carrier and the parameter representing the sector carrier. Further, the network node 110 has received the one or more UL signals as a response to at least one respective transmitted reference signal. This makes it possible for the network node 110 to start evaluating neighbouring relationship between the sector carriers. This is to identify if neighbouring sector carriers within the one or more cells 115 are allocated the same reference signal, and if identified, take actions such that the two neighbouring sector carriers are allocated different reference signals within the cell 115.

The network node 110 evaluates the neighbouring relationship between the sector carriers in the set of sector carriers. This is to identify if two neighbouring sector carriers within the one or more cells 115 comprising the set of sector carriers, are allocated the same reference signal. The evaluating is based on:
the respective reference signals as allocated, and
one or more Uplink, UL, signals received as a response to at least one respective transmitted reference signal.

The evaluation of the neighbouring relationship may be performed each time the UE 120 performs a sector carrier re-selection.

Action 304

When identified that two neighbouring sector carriers are allocated the same reference signal within the one or more cells 115, the network node 110 re-allocates at least one of the two neighbouring sector carriers with another available reference signal such that the two neighbouring sector carriers are allocated different reference signals within the one or more cells 115.

The re-allocating of the at least one of the two neighbouring sector carriers, may be performed each time the UE 120 performs a sector carrier re-selection.

There may still be neighbouring sector carriers that are allocated the same reference signal within the cell 115, after the network node 110 has re-allocates at least one of the two neighbouring sector carriers with another available reference signal such that the two neighbouring sector carriers are allocated different reference signals within the one or more cells 115. Therefore, the evaluation and re-allocation process may be repeated until there are no more neighbouring sector carriers that are allocated the same reference signal identified within the one or more cells 115.

In some embodiments, the network node 110 repeats the evaluating in action 303, of the neighbouring relationship, and the re-allocating, in action 304, of the at least one of the two neighbouring sector carriers, until any one out of:

No more neighbouring sector carriers in the one or more cells 115 are allocated the same reference signals within the one or more cells 115, or a threshold value is exceeded.

Action 305

In some example scenarios, the threshold value is exceeded and neighbouring sector carriers in the set of sector carriers are still allocated the same reference signal within the cell 115. In some of these example scenarios, the network node 110 arranges these neighbour sector carriers into a group of sector carriers. This may be to identify the most optimal sector carrier to be used by a UE using a combination of the reference signal and a measurement of the UL signal strength for all the sector carriers within such a group. From this UL signal strength measurements, the radio node can identify the sector carrier that is the most optimal to use for a UE. Using UL measurements in different sector carriers may be costly for the radio network to perform and therefore it is an advantage if these groups can be as small as possible. Another usage of grouping is to transmit the same data from all sector carriers within the group, and in this case it is therefore not necessary to identify the most optimal sector carrier within the group, since all sector carriers in the group are sending the same information to the UE.

Action 306

In some the example scenarios mentioned in Action 305, the threshold value is exceeded and neighbouring sector carriers in the set of sector carriers are still allocated the same reference signal within the cell 115. In some of these example scenarios, the network node 110 allocates one reference signal to the group of sector carriers.

The above embodiments will now be further explained and exemplified below. The embodiments below may be combined with any suitable embodiment above.

Some examples of embodiments will now be described. The embodiments e.g. relate to the different parameters representing the sector carrier. These may e.g. be any one or more out of:

(i) a direction of the sector carrier, (ii) an index of the sector carrier, such as e.g. SSB indexes, CSI-RS indexes (iii) a random parameter, (iv) a time resource of the sector carrier, and (v) a frequency resource of the sector carrier.

The second embodiments relate to a case when it's not possible to obtain global beam direction, e.g. when the network node uses an omni antenna. In such second embodiments, the global beam direction will be the same for all sector carriers.

The below text relates to Action 301 and 302 described above.

First Embodiments

Figure 9:
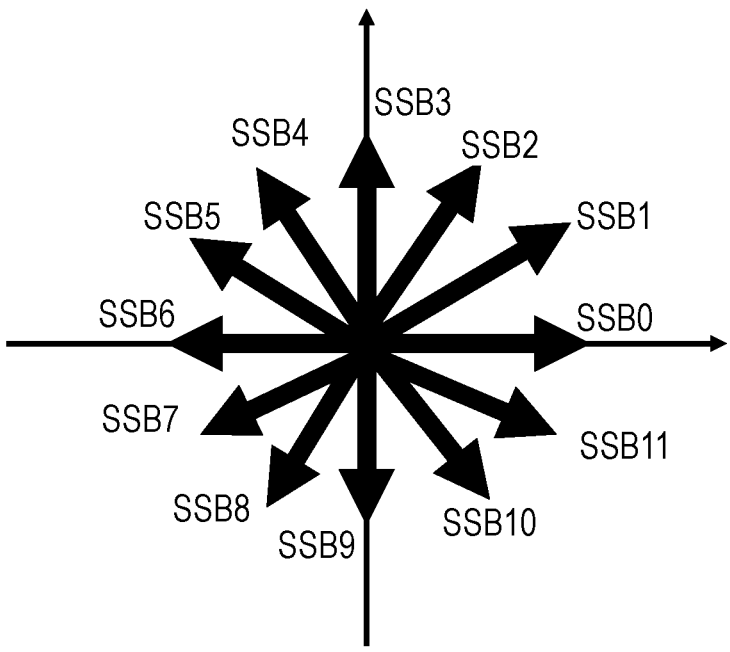
FIG. 9 is a diagram illustrating an example embodiment herein.

In some first embodiments three parameters representing the allocated reference signals are used, one parameter comprises (i) the direction of the sector carrier, the other parameter comprises (ii) an index representing the sector carrier, and the third parameter comprises (iv) a time resource of the sector carrier. This is illustrated in FIG. 9 together with Table 2 below. A direction of one sector carrier may be referred to as one beam direction out of the global beam directions that radiates out from the antennas of the network node 110, a point representing the radiating antenna is represented by Origo of the vector diagram of FIG. 9.

In some of the first embodiments, at the initial cell setup, the reference signals to be allocated to each respective sector carrier is defined as a function of beam direction, see the example in FIG. 9, in which there are 12 sector carriers SSB0 to SSB11 represented by vectors in FIG. 9, with 30 degrees angles in between their respective directions. This covers 360 degrees of directions, also referred to as the global beam directions. Twelve SSB indexes, i.e. 0-11, are assigned to be used for the respective different sector carrier directions, respectively. Table 2 below illustrates the mapping between the sector carrier direction, referred to as the global beam direction in table 2 and the SSB index of the allocated sector carriers, and further the slot. In this example, different SSB indexes have been allocated with different time domain resources, i.e. slots, for transmitting the reference signals in the allocated sector carriers. A correspondent uplink feedback information may be transmitted from the UE 120 to the network node 110 at different slots as well.

TABLE 2

| Global Beam Direction $\phi$ | SSB Index | Slot |
|---|---|---|
| 0 | 0 | 0 |
| $-\pi/6$ | 1 | 1 |
| $-\pi/3$ | 2 | 2 |
| $-\pi/2$ | 3 | 3 |
| $-2\pi/3$ | 4 | 4 |
| $-5\pi/6$ | 5 | 5 |
| $-\pi$ | 6 | 6 |
| $-7\pi/6$ | 7 | 7 |
| $-4\pi/3$ | 8 | 8 |
| $-3\pi/2$ | 9 | 9 |
| $-5\pi/3$ | 10 | 10 |
| $-11\pi/6$ | 11 | 11 |

Figure 10A:
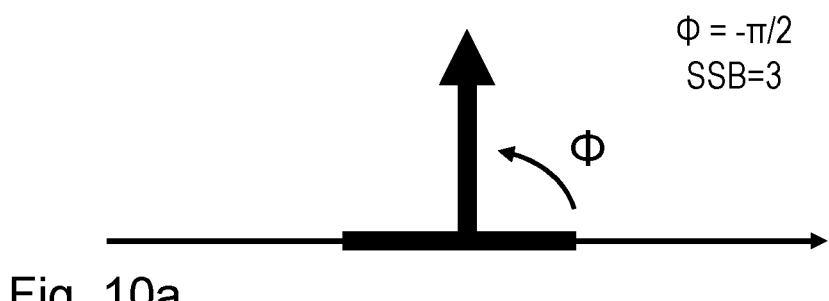
FIG. 10*a-c* are diagrams illustrating an example embodiment herein.
Figure 10B:
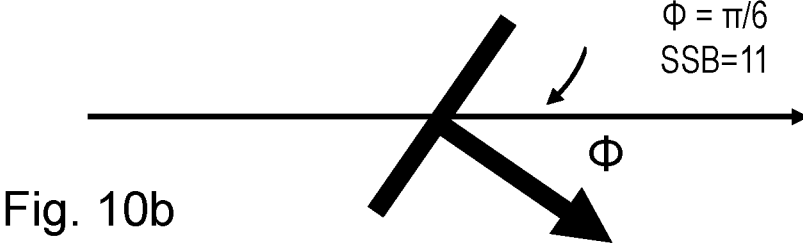
Figure 10C:
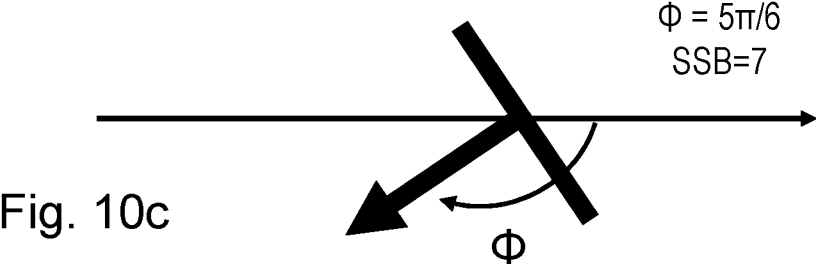

A further example of the first embodiments is described in FIGS. 10a-c, illustrating SSB Indexes representing sector carriers relating to global beam directions for a cell comprising three sector carriers, also referred to as a three sector cell.

FIGS. 10a-c illustrates the three sector cell wherein different sector carrier directions, also referred to as beam directions, are allocated with different SSB indexes and a correspondent time domain resource in slot is also determined.

In FIG. 10a a sector carrier direction $\phi=-\pi/2$ is allocated with an SSB index 3, and time domain resource in slot 3 see Table 2.

In FIG. 10b a sector carrier direction $\phi=\pi/6$ is allocated with an SSB index 11, and time domain resource in slot 11 see Table 2.

In FIG. 10c a sector carrier direction $\phi=5\pi/6$ is allocated with an SSB index 7 and time domain resource in slot 11 see Table 2.

Figure 11:
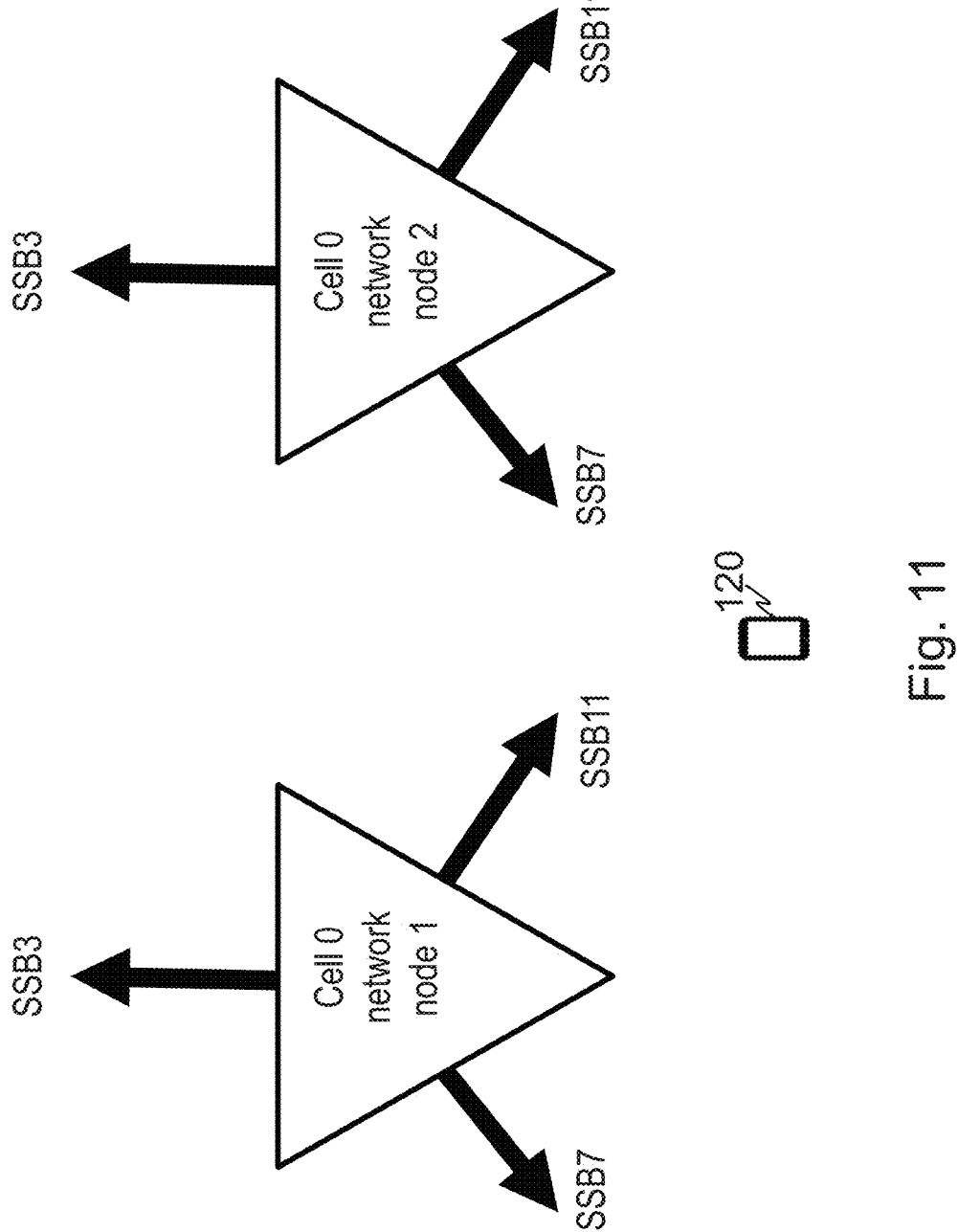
FIG. 11 is a schematic block diagram illustrating embodiments herein.

A further example of the first embodiments is described in FIG. 11, illustrating allocation of sector carriers represented by SSB indexes in two three sector carrier sites provided by multiple network nodes, in this example two different network nodes network node 1 and network node 2 which are combined into one logical cell which is referred to as Cell 0 in FIG. 11. One of the two different network nodes, e.g. network node 1, may be the network node 110.

In both the network nodes 1 and 2, a sector carrier direction $\phi=-\pi/2$ is allocated with an SSB index 3 at slot 3, a sector carrier direction $\phi=\pi/6$ is allocated with an SSB index 11 at slot 11, and a sector carrier direction $\pi=5\pi/6$ is allocated with an SSB index 7 at slot 7.

In the example in FIG. 11, each sector carrier transmitting with one beam direction. The UE 120, which is at an overlap region, will receive transmissions from different sector carriers at the different sites of the first and second network nodes 1, 2. Since the beam direction are different, the SSB indexes are allocated differently and they will be transmitted at the different time resource.

The UE 120 hears SSB11 at slot 11 from the first network node 1, and SSB7 at slot 7 from the second network node 2.

The below text relates to Action 303 and 304 described above. In the examples of the first embodiments, as a response, the UE 120 will transmit a Physical Random Access Channel (PRACH) preamble at the direction of correspondent sector carrier, e.g. SSB, and at the correspondent slot. The UE 120 may also transmit a measurement report of the reference signal allocated to the sector carrier, at correspondent UL slots with the direction of correspondent SSB.

As mentioned above in Action 303, the network node 110 will then evaluate the neighboring relationship between the sector carriers in the set of sector carriers, to identify if two neighboring sector carriers, within a cell 115 comprising the set of sector carriers, are allocated the same reference. The evaluating is based on at least the respective reference signals as allocated, and one or more signals received as a response to at least one respective transmitted reference signal.

This may be performed by the network node 110 at the reception of the response signal in the correspondent slot. The network node 110 will according to the allocation, understand, i.e. know, the slot that the response relating to the sector carrier is received in, the SSB index representing the sector carrier, and the direction that the UE 120 has received the sector carriers from.

As mentioned above in Action 304, when identified that two neighboring sector carriers are allocated the same reference signal within the cell 115, the network node 110 will re-allocate at least one of the two neighboring sector carriers with another available reference signal such that the two neighboring sector carriers are allocated different reference signals within the cell 115.

Therefore, in these first embodiments, by combining the knowledge of the signal strength of the UL reception from the UE 120, the network node 110 will re-allocate, e.g. select, a correspondent sector carrier and beam direction to transmit or receive the signal to or from the UE 120. This is done to ensure that all neighbouring sector carriers are using unique reference signals, which will avoid interference between two neighbouring sector carriers.

Second Embodiments

Figure 12:
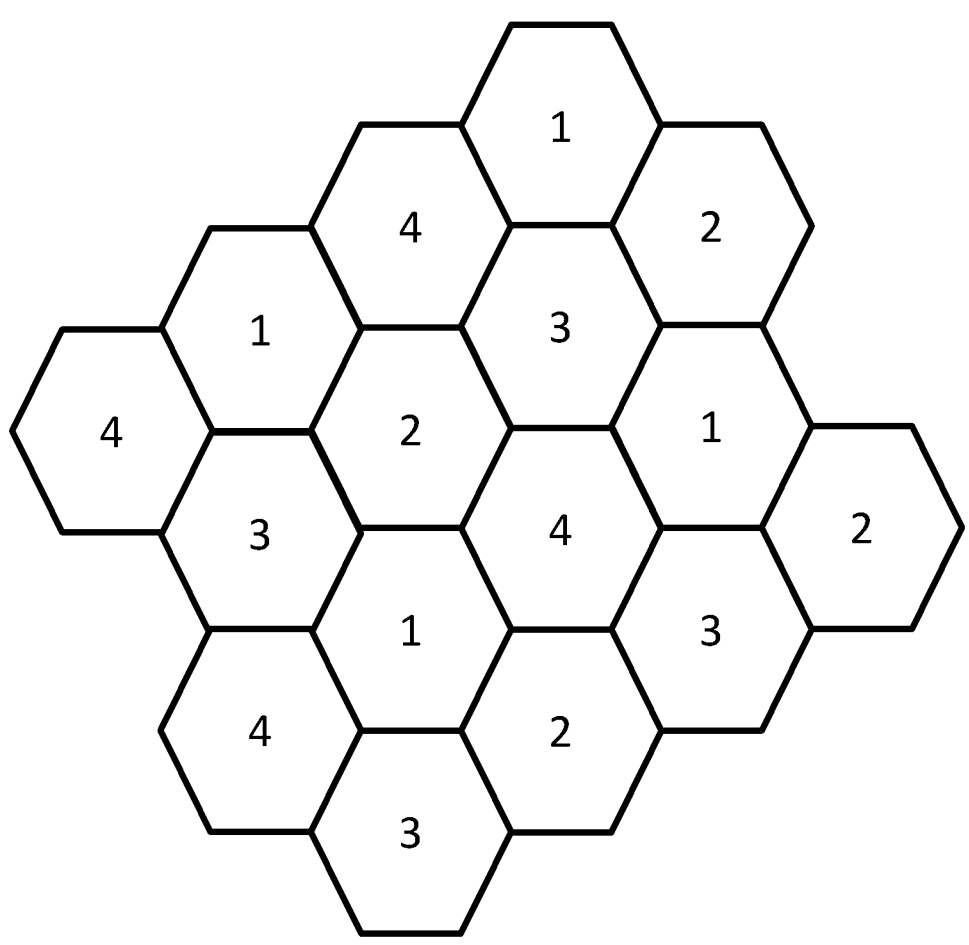
FIG. 12 is a schematic block diagram illustrating embodiments herein.

Some second embodiments relate to scenarios when it is not possible to obtain a global beam direction, such as e.g.

when the network node 110 uses an omni antenna for transmissions of the sector carriers. In such case, the global beam direction will be the same for all sector carriers. In these second embodiments, the parameter representing the sector carrier is (ii) an index of the sector carrier together with a resource index. This is illustrated in FIG. 12. A resource index when used herein may be a specific CSI-RS resource identity, and the figure shows the allocation of this resource index when it is optimal, and hence when the method according to embodiments herein has achieved its goal to ensure that any neighbouring sector carriers all have different reference signals. Alternatively this figure shows the index of the sector carries which is used to identify the sector carrier, and the SSB index is one such index, and this invention could also be used to allocate this index so that all sector carriers have unique sector carrier indexes.

The initial resource index may be determined based on the sector carrier index. It may be a function as below example as illustrated in FIG. 12.

It should be noted that in real deployment, due to inhomogeneous traffic and irregular network deployment, geographic neighbouring and/or beam relation may not be the same as actual radio geometry based neighbouring relation. This means that measurements provided by the UE will give the true actual sector carrier relations.

The below text relates to Action 303 and 304 described above, and to the second step as mentioned above. The second step comprises to keep track of neighboring relationship between the sector carriers in the set of sector carriers, based on one or more UL signals received as a response to at least one respective transmitted reference signal, e.g. in a measurement report sent by UE 120, or actual measurement performed in by the network node 110 based on UL transmission from the UE 120.

The following example algorithm of according to embodiments herein may be used to evaluate the neighbouring relationships between sector carriers within the radio network 102.

Input parameters may be the following parameters: The number of sector carriers in the radio network 102, e.g. in the cell 115. Further, the number of available reference signals, also referred to as resources, that needs to be allocated per sector carrier. The number of available reference signals may be a value range of the resource Id (see below) and may e.g. be a CSI-RS resource or SSB index.

In the evaluation and reallocation, the example algorithm updates and may set the following parameters: A table of sector carrier neighbouring relations, and for each such relation there is an associated weight on how likely this relationship is. Further, an SSB index or a resource Identity index is allocated for each sector carrier, either based on global beam direction or sector carrier identity or randomly if no beam direction can be obtained. The latter relates to an example wherein the parameter is (iii) a random parameter.

An initial step of step 2, may be run when the method is first started and when there is no previously stored information about the sector carrier relationships. Neighbouring relationships that are known to the network node 110 are set and these relationships are associated with a weight of 100%.

Neighboring relationship between the sector carriers in the set of sector carriers are built based on UL signals from the UE 120, e.g. preambles based on e.g. PUCCH and/or PUSCH power and/or SRS. This may be performed according to any one or more out of the following:

The best UL sector carrier, apart from the serving sector carrier, is set as neighbour sector carrier for the current serving sector carrier, If DL power is different between sector carriers, the difference may be considered.

Weight and filtering of the history values may be applied.

If Sector Carrier (SC) such as SC_i and SC_j are neighbours, they will be re-allocated with different SSB indexes, also referred to as different resource indexes.

If SC_i and SC_j, both are neighbours to SC_k, they will be re-allocated with different indexes to all three of them.

Improve the knowledge of the SC neighbour relationship based on Sector Carrier re-selection, also referred to as Layer 2 Hand Over (HO L2) HO. This may be performed by keeping track of the sector carrier neighbouring relationships within a radio network node 110. L2 HO when used herein means that the UE 120, may perform mobility between two sector carriers without the need for signalling on upper layers.

In case not possible to resolve SSB index or resource identity indexes, such as the resource identity without conflict, group neighbour sector carriers s to for the same SSB index or resource identity index, such as resource identity. This relates to Action 305 and 306 described above, comprising arranging these neighbor sector carriers into a group of sector carriers, and allocating one reference signal to the group of sector carriers.

Figure 13:
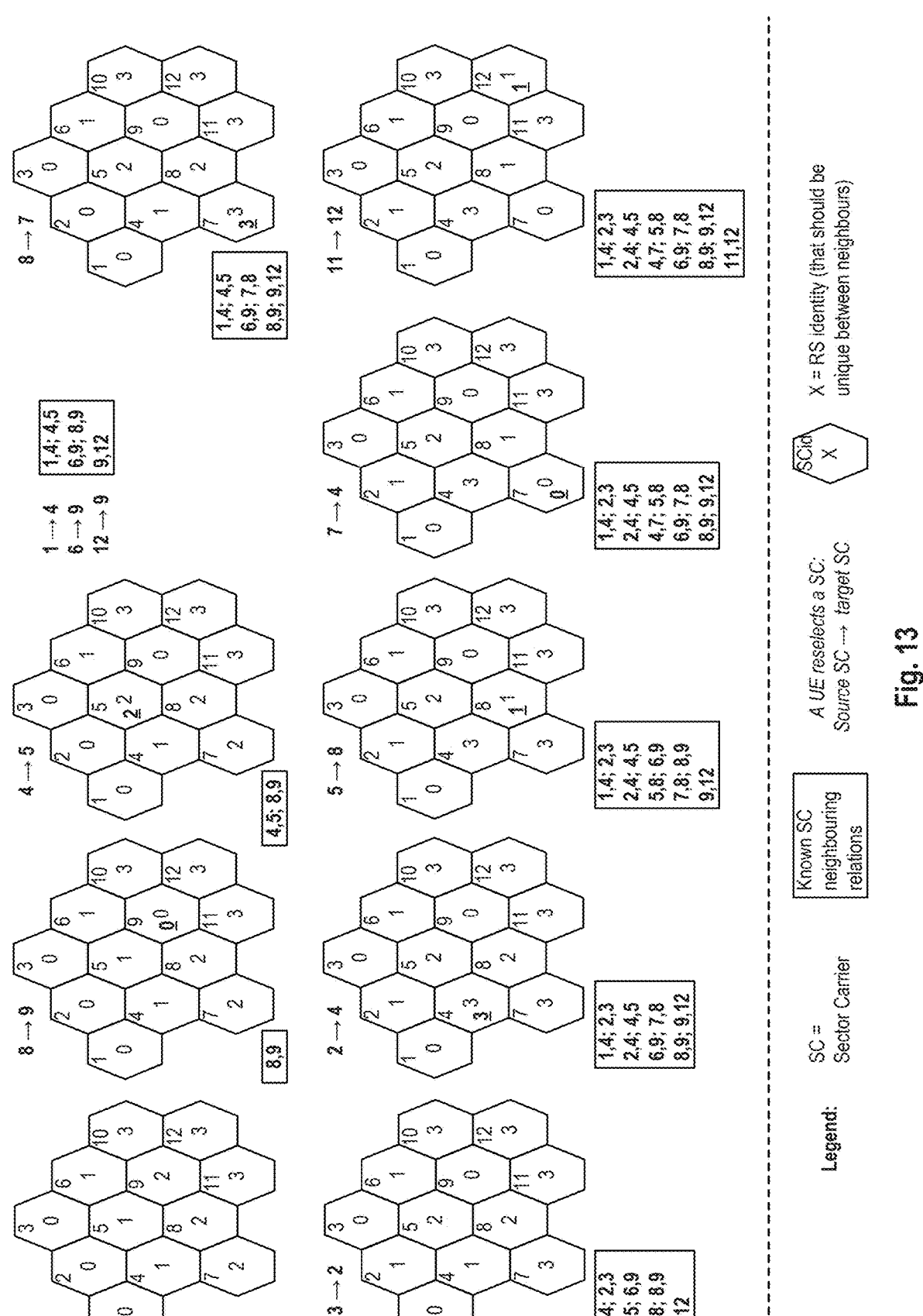
FIG. 13 is a schematic block diagram illustrating embodiments herein.

FIG. 13 gives an example of how embodiments herein may be used to allocate resource and sector carrier indexes for the sector carriers, to ensure that there are no neighbouring sector carriers that have the same index.

FIG. 13 illustrates nine scenarios of an example of the method according to embodiments herein, from random assign of indexes such as resource identities to resolve neighbour conflict, i.e. that two neighboring sector carriers are allocated the same reference signal. The nine scenarios in FIG. 13 runs in order from the left to the right of the top of FIG. 13 followed by from the left to right of the bottom of FIG. 13.

This relates to embodiments wherein the evaluating of the neighboring relationship, and the re-allocating of the at least one of the two neighboring sector carriers, are performed each time the UE (120) performs a sector carrier re-selection, as mentioned above in Actions 303 and 304.

At the far left on the top row, a cell such as e.g. the cell 115, is illustrated that has 12 sector carriers. The sector carriers are numbered from 1 to 12. In each sector carrier an index in this example referred to as a resource identity has been randomly allocated, referred to as assigned in this example, and the value range of this resource identity is 0 to 3. This assignment of resource identities may be changed whenever a UE such as the UE 120 in the cell 150 performs a re-selection of a sector carrier. This is performed in each of the scenarios following scenario 1 in FIG. 13. In the figure a re-selection is shown with an arrow, where the source sector carrier is to the left and the target sector carrier is to the right of the arrow. Also shown within a box in each scenario 1-9 in FIG. 13, is the currently known sector carrier neighbouring relations.

As can be seen in FIG. 13, the resource assignments and the known neighboring relationships are continuously re-allocated in the respective scenarios 1-9, also referred to as updated whenever the UE performs a sector carrier re-selection. Updating of resource assignments is only done when needed to avoid two sector carriers to have the same resource identity. After a number of these sector carrier re-selections have been performed, a final configuration at the far right on the bottom row has now become optimal, because no neighbouring sector carriers are having the same resource identity.

The above example may be used for CSI-RS.

Figure 14:
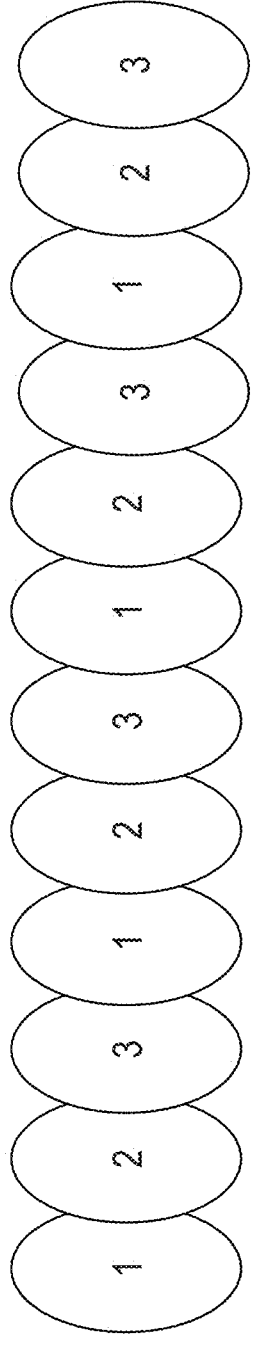
FIG. 14 is a schematic block diagram illustrating embodiments herein.

For SSB index to be used for L2 mobility such as sector carrier selection, embodiments herein may be applied for a row deployment like railway which requires three unique indexes such as identities as illustrated in FIG. 14. The unique indexes are numbered from 1-3 in FIG. 14.

Figure 15:
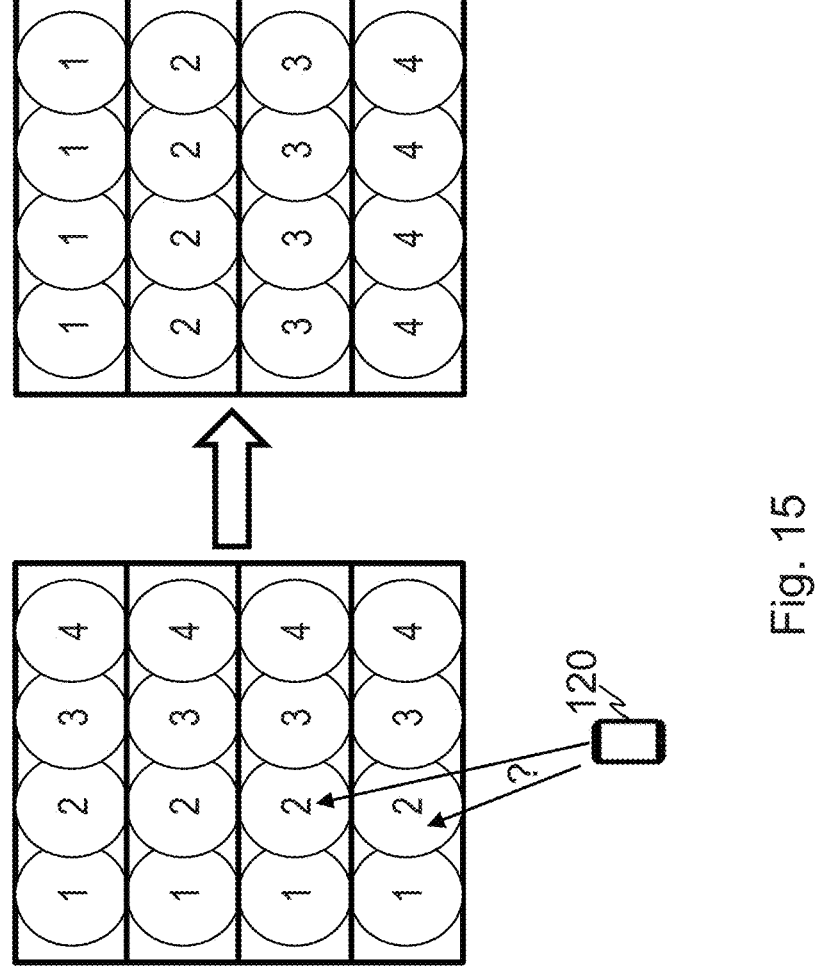
FIG. 15 is a schematic block diagram illustrating embodiments herein.

Embodiments herein may further be applied for indoor type deployment, wherein there may not be enough unique indexes, such as unique identities, for neighbour sector carriers, as illustrated in FIG. 15 In this case, grouping in into four groups numbered 1-4 in FIG. 15, may be applied where sector carriers in the same group is allocated a unique index. This relates to Action 305 and 306 described above, comprising arranging these neighbor sector carriers into a group of sector carriers, and allocating one reference signal to the group of sector carriers. To identify a sector carrier within a group of sector carriers, UL measurements may be used.

The left most sector carrier scenario in FIG. 15 depicts a scenario that four index are assigned to four sector carriers on the same flour. Because of the floor, the sector carrier index 2 on floor 2 can have higher path loss to sector carrier index 1 on floor 1 compare with sector carrier index 2-4 on floor 1. When the UE 120 moves on floor 1 from sector carrier index 1 to sector carrier index 2, sector carrier index 2 on the other floor are also assigned to this UE, which will create unnecessary interference for neighbor sector carriers on the other floor. The right most scenario depicts a better grouping that select suitable neighbors to group. The sector carriers on different floors are more isolated than the sector carriers on the same floor. To group the sector carriers on the same floor which are not well isolated can get the power combining gain since they use the same reference signal and also reduce the interference to sector carriers on other floors.

Figure 16:
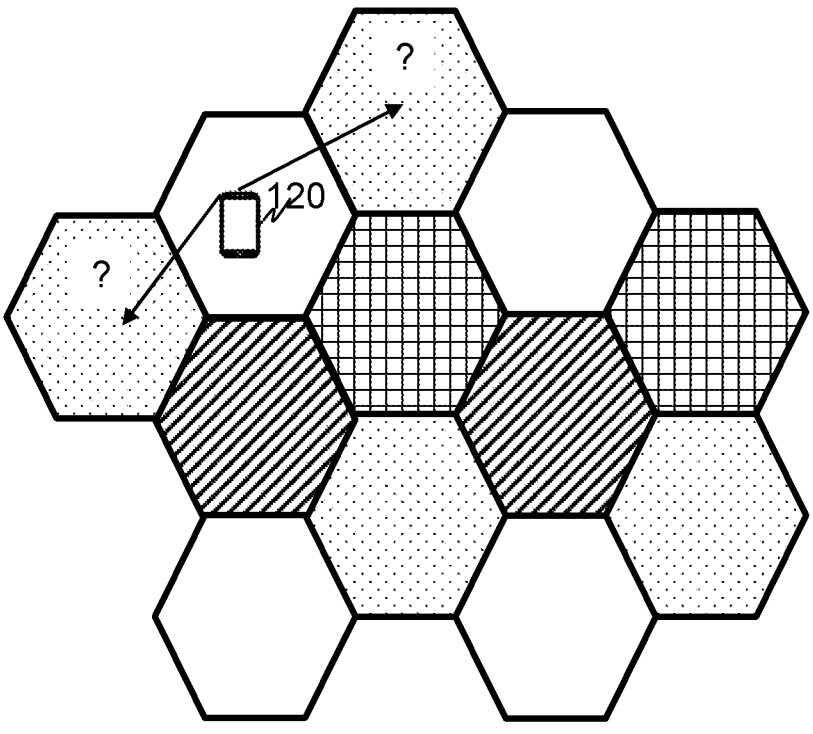
FIG. 16 is a schematic block diagram illustrating embodiments herein.

Embodiments herein may further be applied for outdoor type deployment, which is more complicated, as illustrated in FIG. 16. For outdoor network deployment it may be difficult to avoid have same SSB ID for neighboring sector carriers as shown in FIG. 16.

Neighboring sector carriers that are allocated the same reference signals are referred to as respective dotted patterned hexagons, diagonal patterned hexagons, checked patterned hexagons and empty hexagons in FIG. 16. FIG. 16 illustrates that the system does not know which sector carrier UE 120 is moving to and both sector carriers will be used for UE 120.

In this case, it may also be required to combine UL measurements to identify the neighbour sector carries.

To perform the method actions above, the network node 110 is configured to allocate reference signals to a set of sector carriers provided by the network node 110 for a communication with the UE 120 in the radio network 102. The network node 110 may comprise an arrangement depicted in FIGS. 17a and 17b.

The network node 110 may comprise an input and output interface 1700 configured to communicate with UEs such as the UE 120. The input and output interface 1700 may comprise a wireless receiver (not shown) and a wireless transmitter (not shown).

The network node 110 may further be configured to, e.g. by means of a allocating unit 1710 in the network node 110, allocate reference signals to each respective sector carrier out of a set of sector carriers, by for each respective sector carrier out of the set of sector carriers, allocating a reference signal to the sector carrier, and a parameter representing the sector carrier, wherein the number of available different reference signals to be allocated are adapted to be less than the number of sector carriers in the set of sector carriers.

In some embodiments, the parameter representing the sector carrier, is adapted to comprise anyone or more out of:
    (i) a direction of the sector carrier,
    (ii) an index of the sector carrier, and
    (iii) a random parameter.

The network node 110 may further be configured to, e.g. by means of a transmitting unit 1720 in the network node 110, transmit the reference signal as allocated, in each respective sector carrier.

The network node 110 may further be configured to, e.g. by means of an evaluating unit 1730 in the network node 110, evaluate a neighbouring relationship between the sector carriers in the set of sector carriers, to identify if two neighbouring sector carriers within a cell (115) comprising the set of sector carriers, are allocated the same reference signal, which evaluating is adapted to be based on:
    The respective reference signals as allocated, and
    one or more UL signals received as a response to at least one respective transmitted reference signal.

The network node 110 may further be configured to, e.g. by means of a re-allocating unit 1740 in the network node 110, when identified that two neighbouring sector carriers are allocated the same reference signal within the cell 115, re-allocate at least one of the two neighbouring sector carriers with another available reference signal such that the two neighbouring sector carriers are allocated different reference signals within the cell 115.

In some embodiments, the network node 110 may further be configured to repeat the evaluating of the neighbouring relationship, e.g. by means of the evaluating unit 1730, and the re-allocating, e.g. by means of the evaluating unit 1740, of the at least one of the two neighbouring sector carriers, until any one out of:
    no more neighbouring sector carriers in the cell 115 are allocated the same reference signals within the cell 115, or
    a threshold value is exceeded.

The network node 110 may further be configured to, e.g. by means of the evaluating unit 1730 in the network node 110, evaluate the neighbouring relationship, and re-allocate the at least one of the two neighbouring sector carriers, e.g. by means of the re-allocating unit 1740, each time the UE 120 performs a sector carrier re-selection.

In some embodiments, the network node 110 may further be configured to, when the threshold value is exceeded and neighbouring sector carriers in the set of sector carriers are still allocated the same reference signal within the cell 115, arrange these neighbour sector carriers into a group of sector carriers, and allocate one reference signal to the group of sector carriers.

Figure 17A:
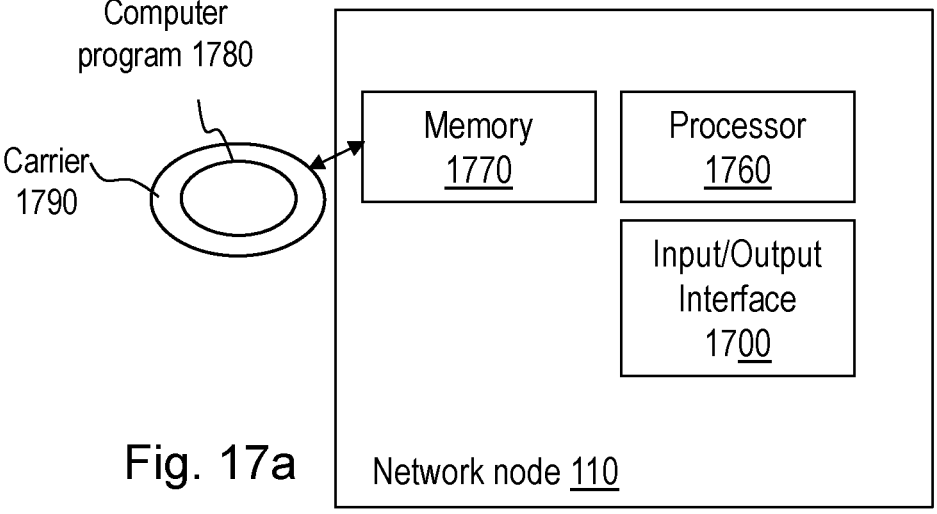
FIG. 17*a-b* are schematic block diagrams illustrating embodiments of a network node.
Figure 17B:
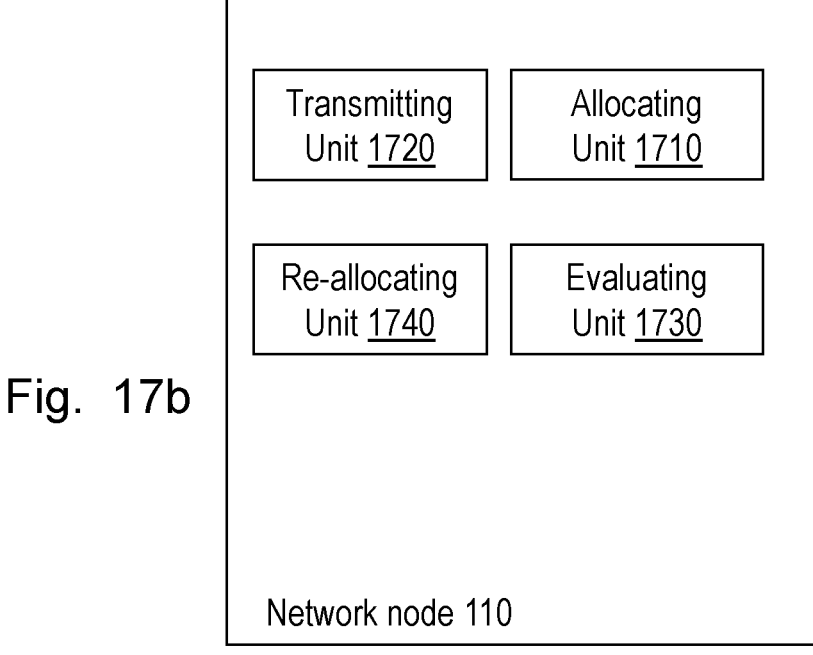

The embodiments herein may be implemented through a respective processor or one or more processors, such as the processor 1760 of a processing circuitry in the network node 110 depicted in FIG. 17*a*, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1770 comprising one or more memory units. The memory 1770 comprises instructions executable by the processor in network node 110. The memory 1770 is arranged to be used to store e.g. information, indexes allocations, re-allocations, indications, data, configurations, and applications to perform the methods herein when being executed in the network node 110.

In some embodiments, a computer program 1780 comprises instructions, which when executed by the respective at least one processor 1760, cause the at least one processor of the network node 110 to perform the actions above.

In some embodiments, a respective carrier 1790 comprises the respective computer program 1780, wherein the carrier 1790 is one of an electronic signal, an optical signal, an electromagnetic signal, a magnetic signal, an electric signal, a radio signal, a microwave signal, or a computer-readable storage medium.

Those skilled in the art will appreciate that the units in the network node 110 described above may refer to a combination of analog and digital circuits, and/or one or more processors configured with software and/or firmware, e.g. stored in the network node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 18:
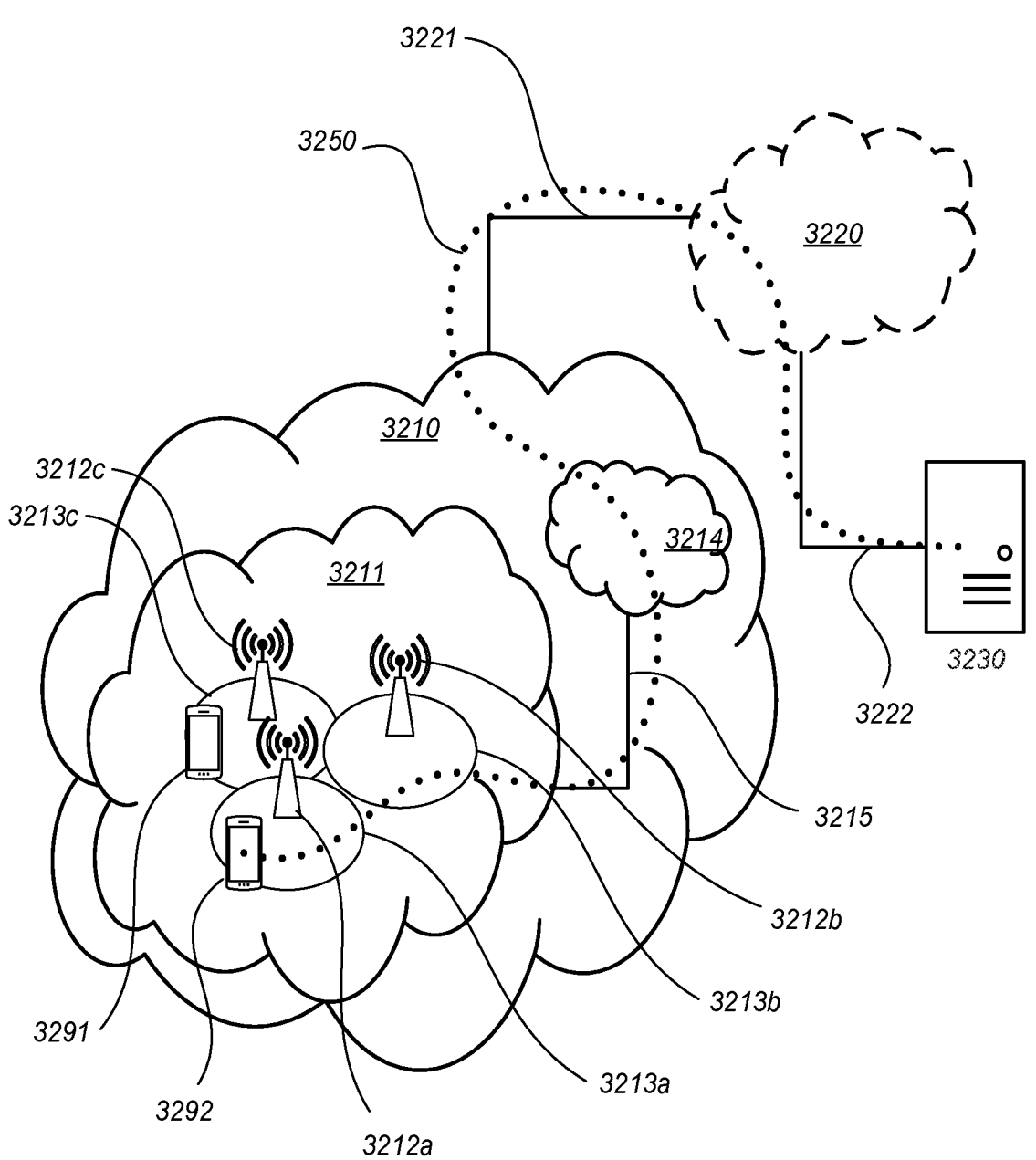
FIG. 18 schematically illustrates a telecommunication network connected via an intermediate network to a host computer.

With reference to FIG. 18, in accordance with an embodiment, a communication system includes a telecommunication network 3210, such as a 3GPP-type cellular network, e.g. radio network 102, which comprises an access network 3211, such as a radio access network, and a core network 3214. The access network 3211 comprises a plurality of base stations 3212*a*, 3212*b*, 3212*c*, such as AP STAs NBs, eNBs, gNBs, e.g. network node 110, or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first UE such as a Non-AP STA 3291, e.g. UE 120, located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 18 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 19. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 19) served by the base station 3320. The communication interface 3326 may be configured to facilitate a connection 3360 to the host computer 3310. The connection 3360 may be direct or it may pass through a core network (not shown in FIG. 19) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 19 may be identical to the host computer 3230, one of the base stations 3212_a_, 3212_b_, 3212_c_ and one of the UEs 3291, 3292 of FIG. 18, respectively. This is to say, the inner workings of these entities may be as shown in FIG. 19 and independently, the surrounding network topology may be that of FIG. 18.

Figure 19:
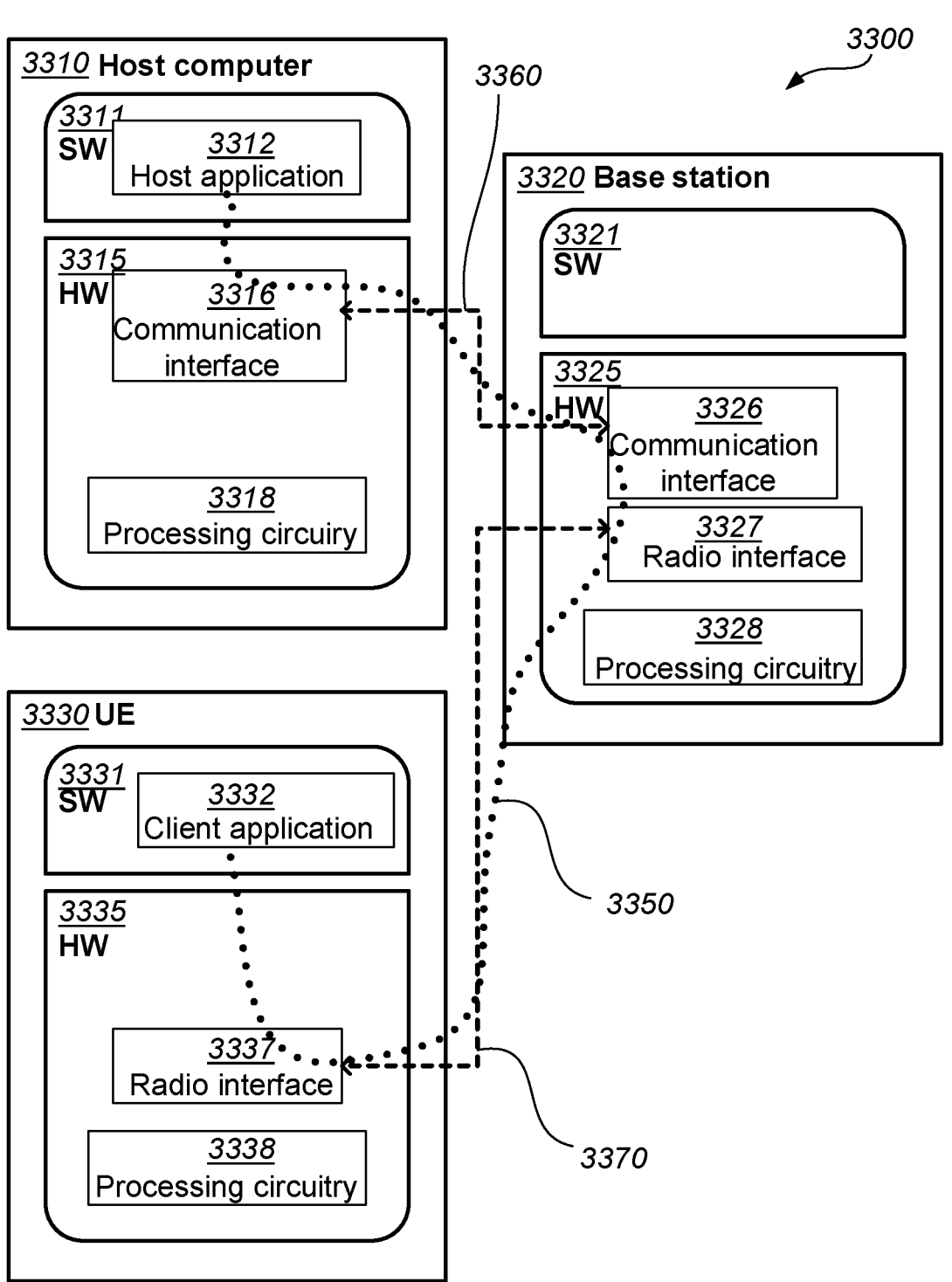
FIG. 19 is a generalized block diagram of a host computer communicating via a base station with a user equipment over a partially wireless connection.

In FIG. 19, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing, e.g., on the basis of load balancing consideration or reconfiguration of the network.

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the RAN effect: data rate, latency, power consumption and thereby provide benefits such as corresponding effect on the OTT service: reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 20, 21:
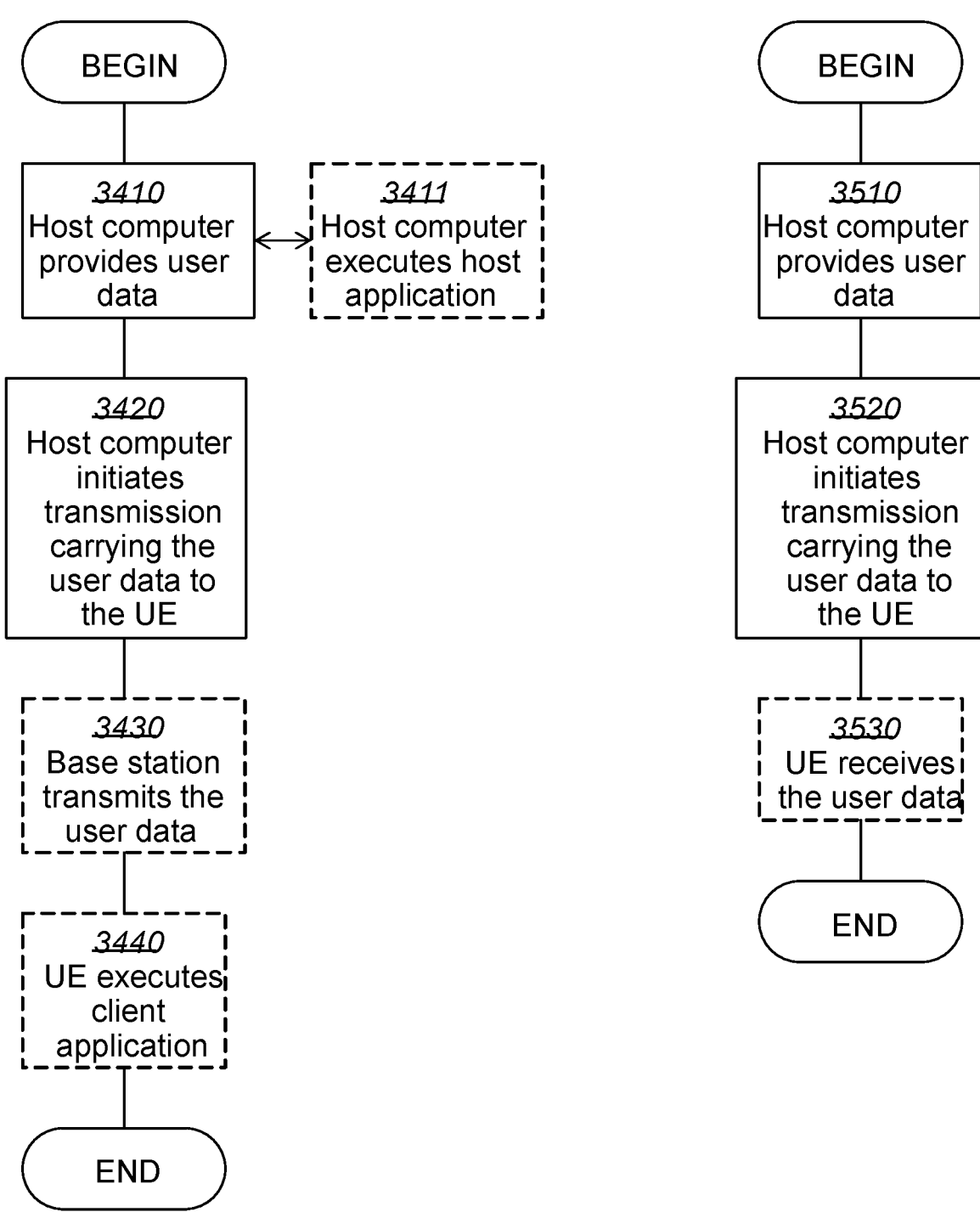
FIGS. 20-23 are flowcharts illustrating methods implemented in a communication system including a host computer, a base station and a user equipment.

FIG. 20 is a flowchart illustrating a method implemented in a communication system, in accordance with one embodiment. The communication system includes a host computer, a base station such as a AP STA, and a UE such as a Non-AP STA which may be those described with reference to FIG. 18 and FIG. 19. For simplicity of the present disclosure, only drawing references to FIG. 20 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 21 is a flowchart illustrating a method implemented in a communication system, in accordance with one embodiment. The communication system includes a host computer, a base station such as a AP STA, and a UE such as a Non-AP STA which may be those described with reference to FIG. 18 and FIG. 19. For simplicity of the present disclosure, only drawing references to FIG. 21 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 22, 23:
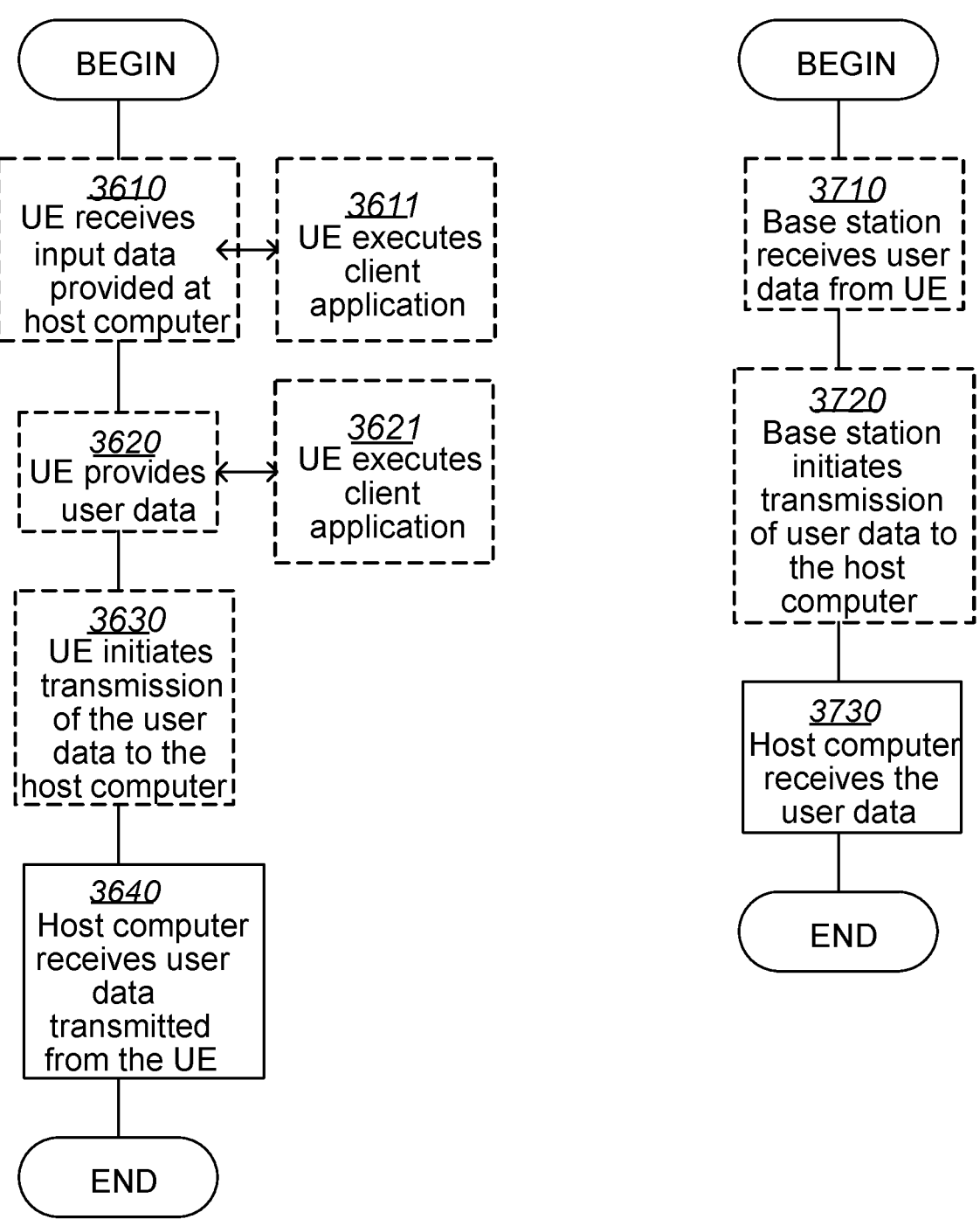

FIG. 22 is a flowchart illustrating a method implemented in a communication system, in accordance with one embodiment. The communication system includes a host computer, a base station such as a AP STA, and a UE such as a Non-AP STA which may be those described with reference to FIG. 18 and FIG. 19. For simplicity of the present disclosure, only drawing references to FIG. 22 will be included in this section. In an optional first step 3610 of the method, the UE receives input data provided by the host computer. Additionally, or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station such as a AP STA, and a UE such as a Non-AP STA which may be those described with reference to FIG. 18 and FIG. 19. For simplicity of the present disclosure, only drawing references to FIG. 23 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for allocating reference signals to a set of sector carriers provided by the network node for a communication with a User Equipment, UE, in a radio network, the method comprising:

allocating reference signals to each respective sector carrier out of a set of sector carriers, by for each respective sector carrier out of the set of sector carriers, allocating a reference signal to the sector carrier, and a parameter representing the sector carrier, wherein the number of available different reference signals to be allocated are less than the number of sector carriers within the set of sector carriers, transmitting the reference signal as allocated, in each respective sector carrier, evaluating a neighboring relationship between the sector carriers in the set of sector carriers, to identify if two neighboring sector carriers within one or more cells comprising the set of sector carriers, are allocated the same reference signal, which evaluating is based on:

the respective reference signals as allocated, and one or more Uplink, UL, signals received as a response to at least one respective transmitted reference signal, and when identified that two neighboring sector carriers are allocated the same reference signal within the one or more cells, re-allocating at least one of the two neighboring sector carriers with another available reference signal such that the two neighboring sector carriers are allocated different reference signals within the one or more cells.

2. The method according to claim 1, further comprising: repeating the evaluating of the neighboring relationship, and the re-allocating of the at least one of the two neighboring sector carriers, until any one out of:

no more neighboring sector carriers in the one or more cells are allocated the same reference signals within one or more cells cell, or a threshold value is exceeded.

3. The method according to claim 1, wherein the evaluating of the neighboring relationship, and the re-allocating of the at least one of the two neighboring sector carriers, are performed each time the UE performs a sector carrier re-selection.

4. The method according to claim 1, further comprising:

when a threshold value is exceeded and neighboring sector carriers in the set of sector carriers are still allocated the same reference signal within the one or more cells, arranging these neighbor sector carriers into a group of sector carriers, and allocating one reference signal to the group of sector carriers.

5. The method according to claim 1, wherein the parameter representing the sector carrier, comprises anyone or more out of:

(i) a direction of the sector carrier, (ii) an index of the sector carrier, and (iii) a random parameter, (iv) a time resource of the sector carrier, and (v) a frequency resource of the sector carrier.

6. A non-transitory computer readable medium comprising instructions, which when executed by a processor of a network node for allocating reference signals to a set of sector carriers provided by the network node for a communication with a User Equipment (UE) in a radio network, causes the network node to:

allocate reference signals to each respective sector carrier out of a set of sector carriers, by for each respective sector carrier out of the set of sector carriers, allocate a reference signal to the sector carrier, and a parameter representing the sector carrier, wherein the number of available different reference signals to be allocated are less than the number of sector carriers within the set of sector carriers, transmit the reference signal as allocated, in each respective sector carrier, evaluate a neighboring relationship between the sector carriers in the set of sector carriers, to identify if two neighboring sector carriers within one or more cells comprising the set of sector carriers, are allocated the same reference signal, which evaluating is based on:

the respective reference signals as allocated, and one or more Uplink, UL, signals received as a response to at least one respective transmitted reference signal, and when identified that two neighboring sector carriers are allocated the same reference signal within the one or more cells, re-allocate at least one of the two neighboring sector carriers with another available reference signal such that the two neighboring sector carriers are allocated different reference signals within the one or more cells.

7. A network node configured to allocate reference signals to a set of sector carriers provided by the network node for a communication with a User Equipment, UE, in a radio network, wherein the network node is further configured to:

allocate reference signals to each respective sector carrier out of a set of sector carriers, by for each respective sector carrier out of the set of sector carriers, allocating a reference signal to the sector carrier, and a parameter representing the sector carrier, wherein the number of available different reference signals to be allocated are adapted to be less than the number of sector carriers within the set of sector carriers, transmit the reference signal as allocated, in each respective sector carrier, evaluate a neighboring relationship between the sector carriers in the set of sector carriers, to identify if two neighboring sector carriers within one or more cells comprising the set of sector carriers, are allocated the same reference signal, which evaluating is adapted to be based on:

the respective reference signals as allocated, and one or more Uplink, UL, signals received as a response to at least one respective transmitted reference signal, and when identified that two neighboring sector carriers are allocated the same reference signal within the one or more cells, re-allocate at least one of the two neighboring sector carriers with another available reference signal such that the two neighboring sector carriers are allocated different reference signals within the one or more cells.

8. The network node according to claim 7, further configured to:

repeat the evaluating of the neighboring relationship, and the re-allocating of the at least one of the two neighboring sector carriers, until any one out of:

no more neighboring sector carriers in the one or more cells are allocated the same reference signals within one or more cells cell, or a threshold value is exceeded.

9. The network node according to claim 7, further configured to: evaluate the neighboring relationship, and re-allocate the at least one of the two neighboring sector carriers, each time the UE performs a sector carrier re-selection.

10. The network node according to claim 7, further configured to:

when a threshold value is exceeded and neighboring sector carriers in the set of sector carriers are still allocated the same reference signal within the one or more cells, arrange these neighbor sector carriers into a group of sector carriers, and allocate one reference signal to the group of sector carriers.

11. The network node according to claim 7, wherein the parameter representing the sector carrier, is adapted to comprise anyone or more out of:

(i) a direction of the sector carrier, (ii) an index of the sector carrier, (iii) a random parameter, (iv) a time resource of the sector carrier, and (v) a frequency resource of the sector carrier.

* * * * *